United States Patent
Ambwani et al.

(10) Patent No.: US 10,467,289 B2
(45) Date of Patent: Nov. 5, 2019

(54) SEGMENTATION OF VIDEO ACCORDING TO NARRATIVE THEME

(75) Inventors: Geetu Ambwani, Washington, DC (US); Anthony R. Davis, Silver Spring, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 937 days.

(21) Appl. No.: 13/195,944

(22) Filed: Aug. 2, 2011

(65) Prior Publication Data

US 2013/0036124 A1 Feb. 7, 2013

(51) Int. Cl.
*G06F 16/783* (2019.01)

(52) U.S. Cl.
CPC .................... *G06F 16/7844* (2019.01)

(58) Field of Classification Search
CPC ............. G06F 17/30796; G06F 16/7844
See application file for complete search history.

(56) References Cited

U.S. PATENT DOCUMENTS

| | | | |
|---|---|---|---|
| 4,227,177 A | 10/1980 | Moshier | |
| 5,493,677 A | 2/1996 | Balogh et al. | |
| 5,521,841 A | 5/1996 | Arman et al. | |
| 5,530,859 A | 6/1996 | Tobias, II et al. | |
| 5,535,063 A | 7/1996 | Lamming | |
| 5,553,281 A | 9/1996 | Brown et al. | |
| 5,594,897 A | 1/1997 | Goffman | |
| 5,640,553 A | 6/1997 | Schultz | |
| 5,649,182 A | 7/1997 | Reitz | |
| 5,682,326 A | 10/1997 | Klingler et al. | |
| 5,717,914 A | 2/1998 | Husick et al. | |
| 5,729,741 A | 3/1998 | Liaguno et al. | |
| 5,737,495 A | 4/1998 | Adams et al. | |
| 5,737,734 A | 4/1998 | Schultz | |
| 5,742,816 A | 4/1998 | Barr et al. | |

(Continued)

FOREIGN PATENT DOCUMENTS

| | | |
|---|---|---|
| WO | 96/12239 | 4/1996 |
| WO | WO 9941684 A1 * | 8/1999 |
| WO | 0205135 | 1/2002 |

OTHER PUBLICATIONS

Pradhan, Sujeet, Keishi Tajima, and Katsumi Tanaka. "A query model to synthesize answer intervals from indexed video units." IEEE Transactions on knowledge and data engineering13, No. 5 (2001): 824-838. (Year: 2001).*

(Continued)

*Primary Examiner* — Jesse P Frumkin
(74) *Attorney, Agent, or Firm* — Banner & Witcoff, Ltd.

(57) ABSTRACT

Content items may be segmented and labeled by a theme to provide information, such as audio or video, with greater functionality, accuracy and speed. The segments and other related information may be stored and made accessible to users through, for example, a search service and/or an on-demand service. Also provided is automatic segmentation that may include any one of receiving a textual description of a content item, determining themes within the textual description, determining relevance intervals corresponding to terms of the theme, filtering and/or merging the relevance intervals, and determining a total interval for each theme that represents one or more contextually-coherent segments of the content item.

20 Claims, 11 Drawing Sheets

(56) References Cited

U.S. PATENT DOCUMENTS

| | | | |
|---|---|---|---|
| 5,761,655 | A | 6/1998 | Hoffman |
| 5,765,150 | A | 6/1998 | Burrows |
| 5,799,315 | A | 8/1998 | Rainey et al. |
| 5,835,667 | A * | 11/1998 | Wactlar et al. ............... 386/241 |
| 5,845,279 | A | 12/1998 | Garofalakis et al. |
| 5,857,200 | A | 1/1999 | Togawa |
| 5,924,090 | A | 7/1999 | Krellenstein |
| 5,928,330 | A | 7/1999 | Goetz et al. |
| 5,956,729 | A | 9/1999 | Goetz et al. |
| 5,982,369 | A | 11/1999 | Sciammarella |
| 6,055,543 | A | 4/2000 | Christensen et al. |
| 6,320,588 | B1 | 11/2001 | Palmer et al. |
| 6,345,253 | B1 | 2/2002 | Viswanathan |
| 6,363,380 | B1 | 3/2002 | Dimitrova |
| 6,366,296 | B1 | 4/2002 | Boreczky et al. |
| 6,374,260 | B1 | 4/2002 | Hoffert et al. |
| 6,463,444 | B1 | 10/2002 | Jain et al. |
| 6,507,838 | B1 * | 1/2003 | Syeda-Mahmood ........................ G06F 16/685 |
| 6,567,980 | B1 | 5/2003 | Jain et al. |
| 6,578,040 | B1 * | 6/2003 | Syeda-Mahmood |
| 6,675,174 | B1 | 1/2004 | Bolle et al. |
| 6,877,134 | B1 | 4/2005 | Fuller et al. |
| 6,882,793 | B1 | 4/2005 | Fu et al. |
| 6,937,766 | B1 | 8/2005 | Wilf et al. |
| 7,206,303 | B2 | 4/2007 | Karas et al. |
| 8,131,552 | B1 * | 3/2012 | Gibbon et al. ............... 704/270 |
| 8,422,787 | B2 * | 4/2013 | Terao et al. ................... 382/177 |
| 8,423,555 | B2 * | 4/2013 | Ambwani ......... G06F 17/30029 707/746 |
| 9,177,080 | B2 * | 11/2015 | Ambwani ......... G06F 17/30029 |
| 2001/0014891 | A1 | 8/2001 | Hoffert et al. |
| 2002/0002564 | A1 | 1/2002 | Munetsugu et al. |
| 2003/0093790 | A1 | 5/2003 | Logan et al. |
| 2003/0163815 | A1 | 8/2003 | Begeja et al. |
| 2004/0125877 | A1 * | 7/2004 | Chang et al. ............ 375/240.28 |
| 2005/0216443 | A1 * | 9/2005 | Morton et al. ..................... 707/3 |
| 2006/0253780 | A1 | 11/2006 | Munetsugu et al. |
| 2007/0055695 | A1 * | 3/2007 | Dorai ................ G06F 17/30796 |
| 2007/0211762 | A1 | 9/2007 | Song et al. |
| 2007/0214123 | A1 | 9/2007 | Messer et al. |
| 2007/0214488 | A1 | 9/2007 | Nguyen et al. |
| 2007/0260700 | A1 | 11/2007 | Messer |
| 2008/0066136 | A1 * | 3/2008 | Dorai et al. ................... 725/135 |
| 2008/0133504 | A1 | 6/2008 | Messer et al. |
| 2008/0175556 | A1 * | 7/2008 | Dorai et al. ..................... 386/52 |
| 2008/0183681 | A1 | 7/2008 | Messer et al. |
| 2008/0183698 | A1 | 7/2008 | Messer et al. |
| 2008/0204595 | A1 | 8/2008 | Rathod et al. |
| 2008/0208796 | A1 | 8/2008 | Messer et al. |
| 2008/0208839 | A1 | 8/2008 | Sheshagiri et al. |
| 2008/0221989 | A1 | 9/2008 | Messer et al. |
| 2008/0235209 | A1 | 9/2008 | Rathod et al. |
| 2008/0235393 | A1 | 9/2008 | Kunjithapatham et al. |
| 2008/0250010 | A1 | 10/2008 | Rathod et al. |
| 2008/0256097 | A1 | 10/2008 | Messer et al. |
| 2008/0266449 | A1 | 10/2008 | Rathod et al. |
| 2008/0288641 | A1 | 11/2008 | Messer et al. |
| 2009/0125534 | A1 * | 5/2009 | Morton et al. ................ 707/100 |
| 2009/0292685 | A1 | 11/2009 | Liu et al. |
| 2012/0226696 | A1 * | 9/2012 | Thambiratnam ........................... G06F 17/30796 707/738 |
| 2013/0114899 | A1 * | 5/2013 | Ambwani et al. ............ 382/176 |

OTHER PUBLICATIONS

U.S. Appl. No. 12/349,934—Notice of Allowance dated Nov. 7, 2011.
European Search Report dated Oct. 6, 2011.
Communication in EP 01 950 739.1-1244 dated Feb. 21, 2011.
U.S. Appl. No. 12/349,934—Office Action dated May 10, 2011.
International Preliminary Examination Report for PCT/US01/20894, dated Feb. 4, 2002.
Towards a Multimedia World-Wide Web Information retrieval engines, Sougata Mukherjea, Kyoji Hirata, and Yoshinori Hara Computer Networks and ISDN Systems 29 (1997) 1181-1191.
An Image and Video Search Engine for the World-Wide Web, John R. Smith and Shih-Fu Chang, Department of Electrical Engineering and Center for Image Technology for New Media Columbia University, New York, NY 10027, pp. 84-95, jrsmith.sfchang@itnm.columbia.edu.
Experiments in Spoken Document Retrieval at CMU, M.A. Siegler, M.J. Wittbrock, S.T. Slattery, K. Seymore, R.E. Jones, and A.G. Hauptmann, School of Computer Science Carnegie Mellon University, Pittsburgh, PA 15213-3890, Justsystem Pittsburgh Research Center, 4616 Henry Street, Pittsburgh, PA 15213.
Eberman, et al., "Indexing Multimedia for the Internet", Compaq, Cambridge Research Laboratory, Mar. 1999, pp. 1-8 and Abstract.
Shaharay: "Impact and Applications of Video Content Analysis and Coding in the Internet and Telecommunications", AT&T Labs Research, A Position Statement for Panel 4: Applications the 1998 International Workshop on Very Low Bitrate Video Coding, 3 pages.
Ishitan, et al., "Logical Structure Analysis of Document Images Based on Emergent Computation", IEEE Publication, pp. 189-192, Jul. 1999.
Chen, "Extraction of Indicative Summary Sentences from Imaged Documents", IEEE publication, 1997, pp. 227-232.
First Office Action in EP01950739.1-1244 dated Mar. 27, 2009.
Messer, Alan et al., "SeeNSearch: A Context Directed Search Facilitator for Home Entertainment Devices", Paper, Samsung Information Systems America Inc., San Jose, CA.
Kontothoanassis, Ledonias et al., "Design, Implementation, and Analysis of a Multimedia Indexing and Delivery Server", Technical Report Series, Aug. 1999, Cambridge Research Laboratory.
Smith, J.R. et al. "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.
Response to European Office Action—EP Appl. 12178781.6—submitted Dec. 22, 2015.
Extended European Search Report—EP 12178781.6—dated May 21, 2015.
Yoshihiko Kawai et al: "Automated production of TV program trailer using electronic program guide", Proceedings of the 6th ACM International Conference on Image and Video Retrieval. CIVR'07. Jul. 9-11, 2007. Amsterdam. Jul. 9, 2007 (Jul. 9, 2007). pp. 49-56, ACM Press. New York. USA.
Jun. 18, 2018—Canadian Office Action—CA 2,784,366.
Jun. 6, 2019—Canadian Office Action—2,784,366.

* cited by examiner

SEGMENTATION OF VIDEO ACCORDING TO NARRATIVE THEME

TECHNICAL FIELD

Aspects of the disclosure relate to processing data files, media files and other content items, such as files containing movies, television shows, sporting events, etc. One or more aspects relate to the identification of segments in a content item according to themes.

BACKGROUND

As communication technologies, such as the Internet, and interactive technologies, such as a video-on-demand service, increasingly rely on more information-rich types of media to enhance their popularity and/or capabilities, there is an increasing need to process such information. Processing may be configured to, for example, capture, analyze, segment, index, retrieve, and/or distribute the massive amount of information contained within the types of media used within these technologies to help users sift through the content and find the portion(s) that will be of most interest. However, due to the massive amount of information within media (e.g., a single day's worth of television programming may contain thousands and thousands of hours of content, addressing thousands and thousands of topics, narrative themes, etc.), attempting to capture, analyze, segment, index, retrieve and/or distribute information from a static document may be extremely difficult. Therefore, the processing of certain types of information-rich media files is often performed using manual judgments and determinations. For example, producers of the television show "60 Minutes" may manually generate a textual description of the news segments appearing in this week's episode, identify the three stories to be run in tonight's episode, and provide that textual description to broadcasters. That description can then be provided to users, and can be searched using simple text searches to find programs containing topics of interest. Users can then record those programs.

This approach, however, is not perfect. Content producers do not always provide descriptions, or sufficiently detailed descriptions. The summary or descriptions may be lacking; it may, for example, identify a single segment as being "discussing the latest tax proposal in Congress," and fail to provide additional details (e.g., the formal title or number of a piece of legislation, its sponsor, etc.) that may be useful in supporting a meaningful search by the user. Thus, there remains an ever-present need to provide more useful information to users, for example, to provide for the capture, analysis, segmentation, indexing, retrieval and distribution of information related to media with greater functionality, accuracy and speed.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

In some embodiments herein, a content supplier or provider may utilize a plurality of computing devices to allow the segmentation and distribution of media content items to user devices. The plurality of computing devices may include a content database, a relevance interval database, a segment database, a content server, a data analysis server, a relevance interval calculation server, a segment calculation server, a distribution server, and a network that provides communication between the various databases and servers of the content supplier. The segments of the content items may be indexed, for example, by theme, and then later retrieved and transmitted to a user device for consumption by a user.

In some embodiments, computing devices may be configured to perform a method of segmenting one or more content items according to a narrative theme. For example, a textual transcript of a program (e.g., closed-captioning data, transcript file, etc.) may be received and processed to calculate relevance intervals. A relevance interval may be generated for each term. The relevance interval for a term may identify an interval within the program (e.g., number of lines in the transcript above and below the line in which the term appears; or a time segment before and after the point in time at which the term appears, etc.) over which the term is deemed to be relevant. A relevance interval can be determined by comparing the term with other terms in the latter/earlier lines or segments of the program, and consulting a database identifying a statistical strength value for how contextually related the two terms are (e.g., the terms "dog" and "leash" may be more likely to be contextually related than the terms "dog" and "physics," for example). Using the relevance intervals, a content item can be segmented by themes. A theme may include one or more words and the relevance intervals for each word in the theme may be determined (e.g., retrieved from a database storing the relevance intervals for the content item). Upon determining the relevance intervals for the individual words of the theme, the relevance intervals may be filtered and/or merged to identify a total interval that represents one or more contextually-coherent segments in the content item (e.g., a segment that relates to dogs, such as if lines 10-20 of the transcript contained a conversation mostly about dogs). The total interval can also be filtered and/or merged. Information related to the total interval can then be used (e.g., stored in a searchable index) to help users who wish to locate segments of interest (e.g., if a user wishes to find conversations about dogs in this evening's show).

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Some embodiments may be described in the context of a network providing services to user devices over various networks using one or more protocols. The disclosure is not limited to any particular type of network or networks using a specific type of communication medium or to a specific set of communication protocols.

Figure 1:
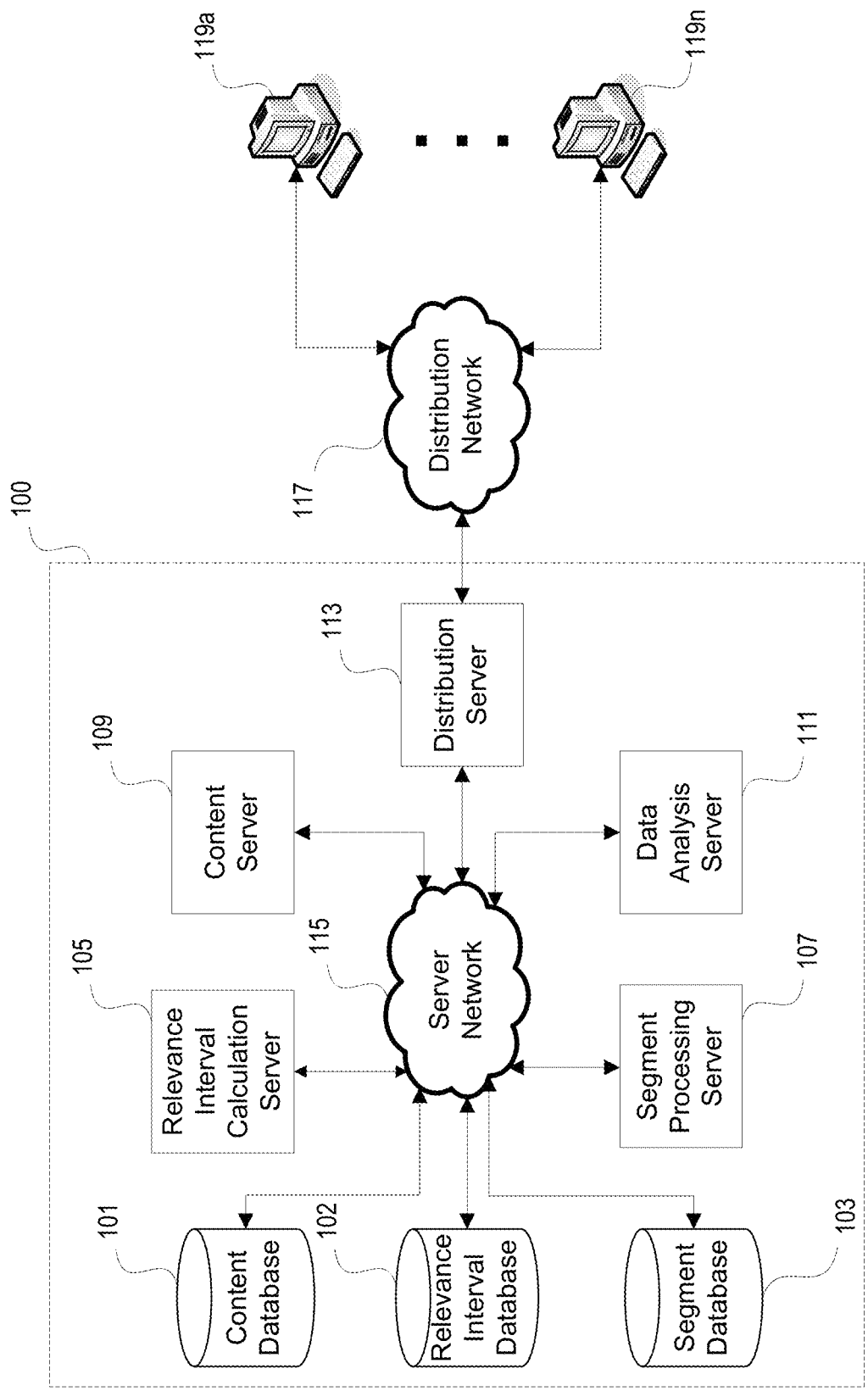
FIG. 1 is a block diagram showing an illustrative system in which content items may be segmented and distributed to users in accordance with one or more aspects of the disclosure.

FIG. 1 is a block diagram showing an illustrative system in which content items may be segmented or otherwise processed according to the disclosure, and distributed to or accessed by users. In the embodiment illustrated in FIG. 1, content supplier or provider 100 may provide, or make available for access, content items. Content items may take various forms, including items having video (e.g., a video program), audio (e.g., an audio file), text, data, and/or animations (e.g., Adobe® Flash files). Content supplier 100 may also provide services related to the content items (e.g., video-on-demand, Internet or other network access services, etc.) to one or more users. According to aspects of this disclosure, content supplier 100 may distribute to the user devices the content items, segments of the content items (e.g., portions of a television program, chapters in a story or movie, etc.) and/or services using the content items and/or the segments. Content supplier 100 may provide the segments of the content items with, for example, descriptive labels and/or topics (e.g., topic names or thematic labels for different stories in this week's episode of the "60 Minutes" news program). Content items that have been segmented by theme/topic can be used in various manners by the content supplier 100 to provide users with more interactive and/or information rich services related to information-rich media, such as audio or video. For example, in some arrangements, content supplier 100 may store a searchable index of segmented content. The index may label each segment according to one or more topics, and identify the start/end times in the content. Content supplier 100 may receive a request from a user for segments of content items matching a narrative theme (e.g., plot line, plot point, plot device, etc.). In response, the content supplier 100 may retrieve one or more matching segments (e.g., all segments having a label matching and/or including the particular sports team) and transmit the results in a desired format, such as via an Internet Protocol (IP) video stream, or transmit a list of results (e.g., web page, electronic program guide menu display, etc.). Additionally or alternatively, the segments may be transmitted as part of a service, such as a video-on-demand service, or other service.

In other arrangements, content supplier 100 may organize one or more content streams (e.g., video channels or services, datastreams, etc.) according to particular labels and/or narrative theme, and stream the organized segments over the corresponding content stream. For example, one channel or service may be made to carry all sports segments from the day. In yet other arrangements, content supplier 100 may allow a user to receive recommendations of thematically similar content items and/or segments. In some instances, the recommendations may be based on a particular content item and/or segment, such as a content item or segment currently being viewed by a user.

To provide the segmented content to the user devices, content supplier 100 may be configured to employ processes configured to, or related to, capture, analyze, segment, index, store, and/or retrieve segments of the content items. To accomplish this, content supplier 100 may use various databases and servers to provide the desired functionality. For example, in the illustrated embodiment of FIG. 1, content supplier 100 includes a content database 101, relevance interval database 102, segment database 103, and computing devices related to a content server 109, data analysis server 111, relevance interval calculation server 105, segment processing server 107, distribution server 113, and a server network 115 that provides communication between the various databases and servers of the content supplier 100.

Content database 101 may store a plurality of content items and other data associated with a service offered by content supplier 100 to users. A content item may include data, audio and/or visual content and may be associated with particular programs, media files, or other content files. For example, a content item may be one or more video and/or audio files associated with a particular television show, movie, commercial, sporting event, news report, public service announcements and the like, because the item includes content for that show, movie, commercial, etc. The content server 109 may be configured to perform various tasks related to the content and/or services of the content supplier 100, including the tasks of receiving content items, storing content items in the content database 101, receiving requests associated with content or services via distribution server 113, retrieving content and/or data associated with a service from the content database 101, and transmitting the content and/or other data to the distribution server 113.

Data analysis server 111 may be configured to perform specific functions related to the analysis of content items, including data extraction (e.g., speech recognition of audio, optical character recognition of onscreen visual text, image processing algorithms of onscreen text, etc.) and analysis of the extracted data (e.g., natural language processing, logical structure analysis, anaphora resolution, etc.). Results of the data extraction and/or analysis may be stored in the content database 101. In some embodiments, content database 101 may include text from the content items, such as textual transcripts, closed captioning data, and the like. In some instances, the text may include data extracted and/or generated by the data analysis server 111.

Relevance interval calculation server 105 (e.g., a computing device) may be configured to analyze individual terms and/or phrases from the content's text (e.g., its transcript, closed captioning data, textual description, etc.), and identify relevance intervals for the various terms and phrases in that text. A term's relevance interval may identify one or more sections of a content item (e.g., lines of dialog within the transcript, time portions of the show, etc.) that are deemed relevant to that term. Relevance intervals, and example methods of calculating relevance intervals, will be discussed in detail below. The calculated relevance intervals may be stored in relevance interval database 102.

Segment processing server 107 (e.g., a computing device) may be configured to analyze the content's text (e.g., transcript, etc.) and the relevance intervals identified by the relevance interval calculation server 105, and identify and determine thematic segments within the content items (e.g., by creation of a searchable index of the segments). Segment processing server 107 may also otherwise process the segments and store information related to the segments in one or more of the databases, including segment database 103. For example, segment processing server 107 may determine segments or intervals of the content item with respect to some identified themes and store data identifying the segments/intervals and the corresponding themes. In one example, segment processing server 107 may analyze a content item for a television show and identify segments of the content item for a number of identified themes (e.g., one or more segments related to a first theme, one, one or more segments related to a second theme, etc.). The segment database 103 may store data such as indexes, pointers or other indicators of the segments, including indicators of where a segment begins, how the segments relate to the theme, etc. Various manners in which a segment is identified and/or determined are discussed in detail below.

Distribution server 113 (e.g., a computing device) may process communication between the content supplier 100 and one or more user devices 119a-119n. As illustrated in FIG. 1, distribution server 113 may transmit information via the distribution network 117 to the user devices 119a-119n. Distribution server 113 may also receive information from the user devices 119a-119n via the distribution network 117. User devices 119a-119n may be a heterogeneous mix of various computing devices, including a network gateway, personal computer, web-enabled cellular phone, personal digital assistant, laptop computer, television set-top box, digital video recorder, etc.

Distribution network 117 may be any type of network, such as satellite, telephone, cellular, wireless, Ethernet, twisted pair, fiber, coaxial, a hybrid fiber/coax network (e.g., a coaxial/fiber network), etc., or a combination of networks. In some embodiments, the distribution network may include components not illustrated, such as modems, bridges, routers, splitters, filters, amplifiers, wireless access points, Bluetooth® devices, and other connectors of various formats (e.g., HDMI, Multimedia over Coax Alliance, etc.) to assist in conveying the signals to their destination. Accordingly, distribution server 113 may be configured to manage communications between devices on the distribution network 117 and other devices of the content supplier 100. For example, in a coaxial cable or hybrid fiber/coax system, the distribution server 113 or network 117 may include a termination system, such as a cable modem termination system (CMTS). The CMTS may be as specified in the Data Over cable Service Interface Specification (DOCSIS) standard, published by Cable Television Laboratories, Inc. (a.k.a. CableLabs), or it may be a similar or modified device instead. The termination system may be configured to place data on one or more downstream frequencies to be received by modems, such as cable modems, at the premises of the user devices 119a-119n, and to receive upstream communications from one or more modems on one or more upstream frequencies. Similar or other appropriate types of distribution servers may be used for other types of distribution networks, such as an optical fiber termination system for optical media, telephone line DSLAM (Digital Subscriber Line Access Multiplexer) for telephone lines, satellite transceivers, cellular telephone stations, local area wireless (e.g., WiMax), etc.

Figure 2:
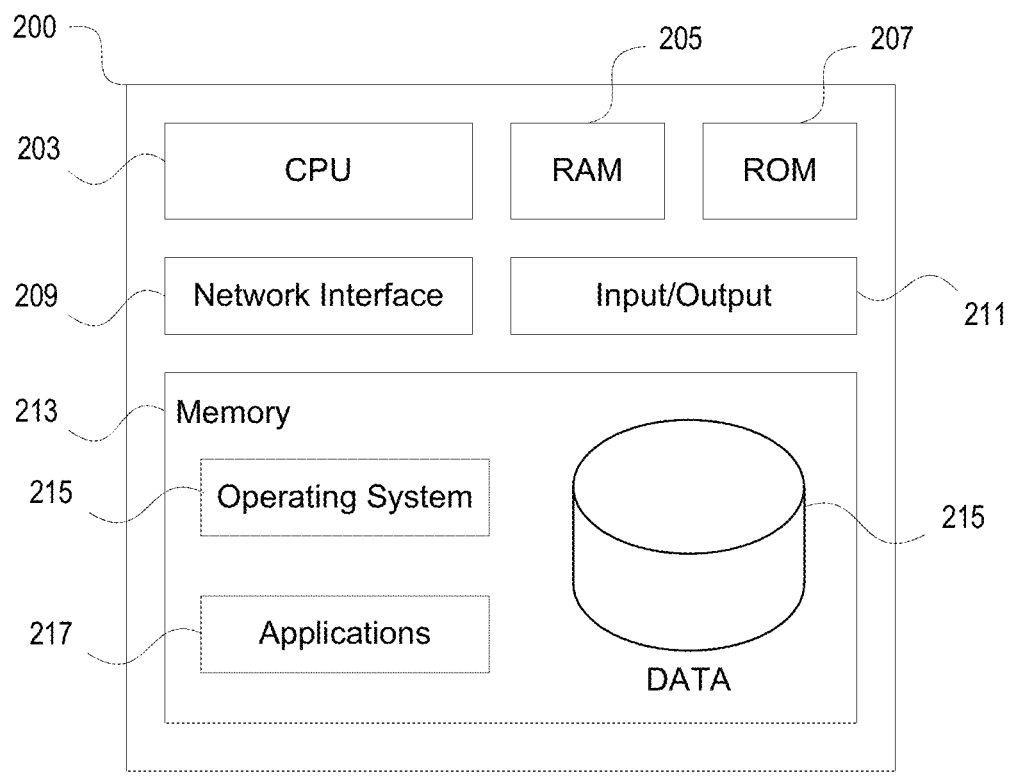
FIG. 2 illustrates a computing device that may be used to implement various methods and/or devices in accordance with one or more aspects of the disclosure.

FIG. 2 illustrates a computing device that may be used to implement various devices described herein (e.g., the various servers, user devices, and/or databases of FIG. 1). The computing device 200 may include one or more processors 203, which may execute instructions of a computer program to perform any of the features described herein. Those instructions may be stored in any type of computer-readable medium or memory, to configure the operation of the processor 203. For example, instructions may be stored in a read-only memory (ROM) 207, random access memory (RAM) 205, or other media accessible by the computing device, such as a Universal Serial Bus (USB) drive, compact disk (CD), digital versatile disk (DVD), floppy disk drive, etc. Input/output module 211 may include a microphone, keypad, touch screen, and/or stylus through which a user of computing device 200 may provide input, and may also include one or more of a speaker for providing audio output and a video display device for providing textual, audiovisual and/or graphical output. Software may be stored within memory 213 (e.g., hard drive), RAM 205, and/or ROM 207 to provide instructions to processor 203 for enabling the computing device 200 to perform various functions. For example, memory 213 may store software used by the computing device 200, such as an operating system 215, application programs 217, and an associated database 215. Alternatively, some or all of computing device 200's computer executable instructions may be embodied in hardware or firmware (not shown). Additionally, computing device 200 may operate in a networked environment supporting connections to one or more networked devices. Accordingly, computing device 200 may use network interface 209 to connect to the network. Network interface 209 may manage communications over various networks using various formats, including protocols such as TCP/IP, Ethernet, FTP, HTTP, WiMax, MoCA, Bluetooth® and the like.

One or more aspects of the disclosure may be embodied in computer-useable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 3:
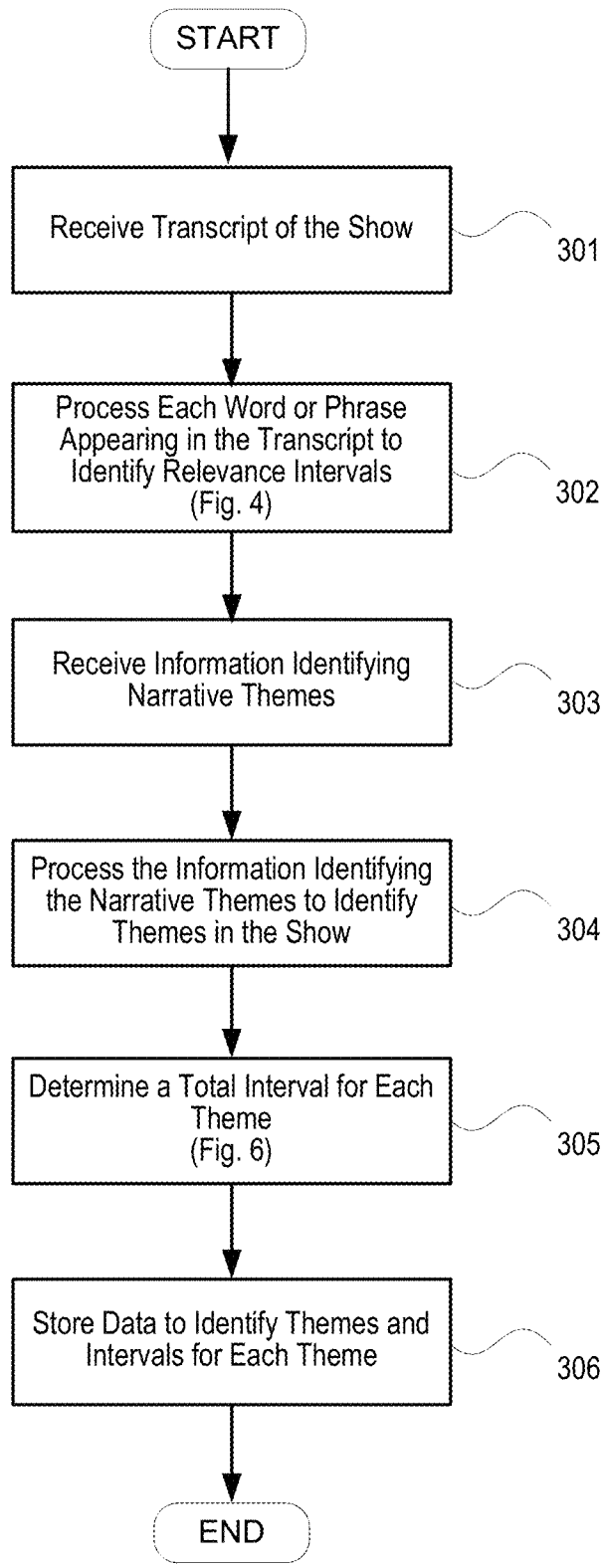
FIG. 3 is a flowchart illustrating an example method for identifying intervals within a content item according to one or more aspects described herein.

One or more aspects of this disclosure relate to providing a method for the segmentation of content items, such as identifying portions of an audiovisual program. The method may segment the content item by determining intervals within the content item that are contextually-cohesive with respect to a particular theme. FIG. 3 is a flowchart illustrating an example method for identifying intervals within a content item in which different themes, such as narrative themes, are discussed or appear (e.g., the times within an episode of 'Friends' in which Joey talks about his job). The method itself may be performed by a computing device such as a processing server, such as segment processing server 107. In general terms, the FIG. 3 process may involve receiving a textual transcript of a show (e.g., a show being one example of a content item, and a line-by-line script of spoken words being one example of a textual transcript), processing each individual word or data interval in the transcript to identify relevance intervals for each word (a transcript word's relevance interval may identify the number of sentences before and after that are related to the word, and can be generated using a relationship measurement database that maps strengths of relationships between various pairs of words), receiving or otherwise determining a textual description of the narrative themes in the show (e.g., a written show summary provided by the show's producers), and totaling the relevance intervals of the words in the text description to result in a total interval of the show for the narrative theme.

In step 301, the server 107 may receive or otherwise determine a transcript of the show (e.g., television program, movie, song, webcast, or other content item). The transcript may include, for example, a line-by-line script, record, or listing of the words spoken (or other suitable data interval) in the show, along with any additional relevant or identifying information, such as the identity of the speaker, the time within the show (e.g., time offset from the start, or absolute time of day when spoken if the show was transmitted according to a schedule), volume or tone, or any other characteristic of the spoken dialogue.

Figure 4:
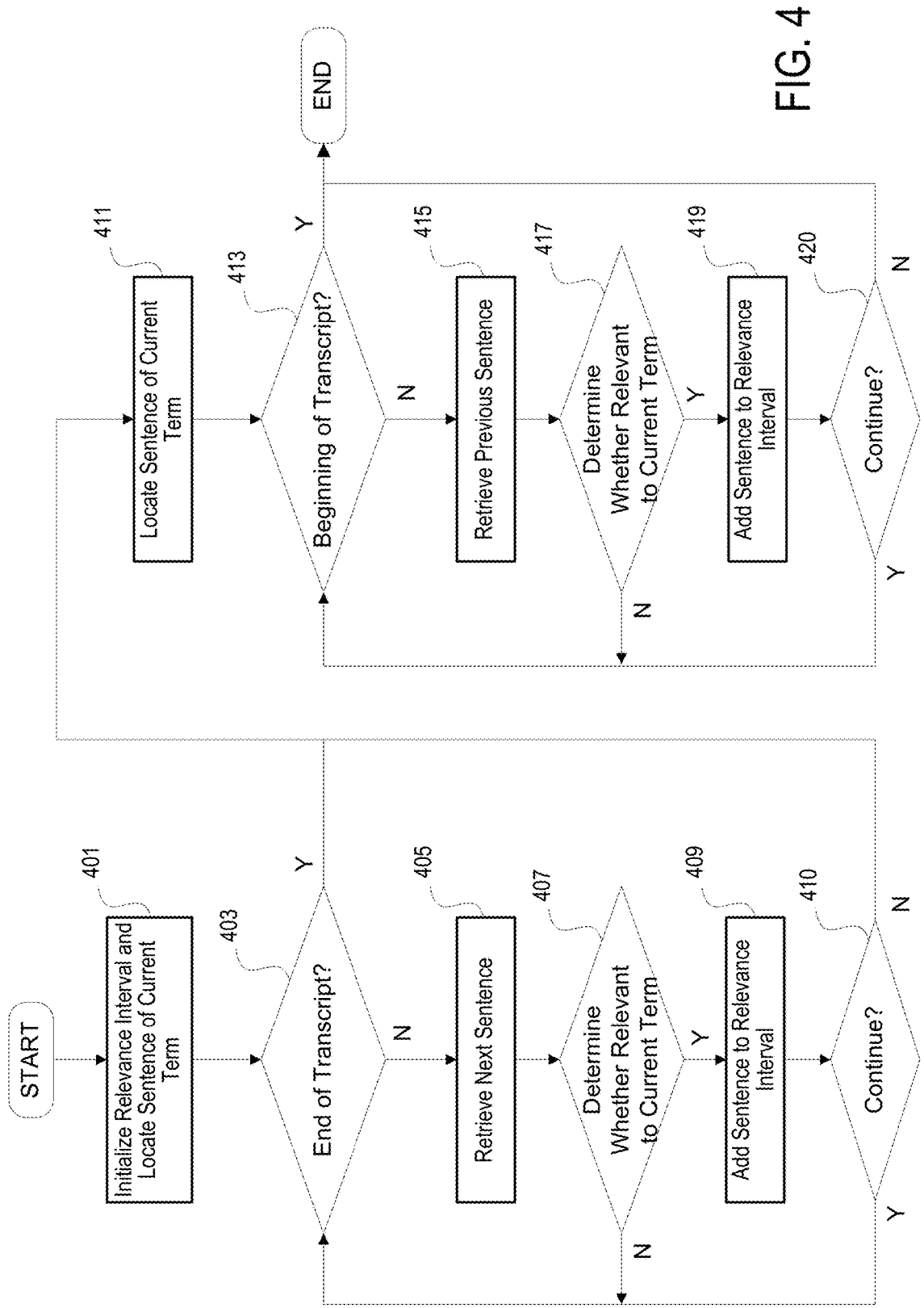
FIG. 4 is a flowchart illustrating an example method for calculating a relevance interval for a word according to one or more aspects described herein.

In step 302, the server 107 may process each word or phrase appearing in the transcript to identify that word or phrase's relevance interval within the transcript. As noted above, a word's relevance interval can identify one or more portions of the content (e.g., sentences or time before and after the word's appearance in the transcript) that are contextually relevant to the word. FIG. 4 illustrates an example process by which a relevance interval for a single word (or phrase) can be determined. As a result of step 302, the server 107 may generate a data record for each word or phrase, where the record identifies a portion (e.g., range of sentences or times) of the show that is contextually related to that word or phrase. These data records, also referred herein as relevance intervals, may then be processed in the steps below, and combined to result in the relevance interval for a particular narrative theme.

In step 303, the server 107 may receive, or otherwise determine, information identifying or describing the themes that are expected to be found in the show. For example, the information identifying the themes may be in the form of a description of the show, such as one appearing in an electronic program guide (EPG). For example, producers of the television show "60 Minutes" may provide a short textual description accompanying each episode, identifying the different topics in the episode. The terms of the textual description may describe one or more narrative themes of the content item. Each narrative theme may include a plurality of terms and/or sentences (e.g., a television drama may have sentences describing different plotlines in tonight's episode). For example, an episode of "60 Minutes" may contain a first segment described as "Congress's New Tax Proposal," a second segment described as "The Killer Who Got Away," and a third segment described as "The NFL's Mystery Man", and the textual description can contain these segment descriptions. In some embodiments, the information identifying the narrative themes may be manually entered and/or supplied by a user and/or a content supplier. For example, a summary of the plot lines for a television show may be received in conjunction with a broadcast of the television program, such as with electronic program guide (EPG) data, or the plot line summaries can be downloaded from a third-party server (e.g., from a web server and/or extracted from a website).

At step 304, the system may process the information identifying the narrative themes (e.g., the textual description) to identify the themes to look for in the content. Determining the one or more themes may include analyzing the textual description, and separating it into different themes that can be searched for in the program (e.g., story lines, news categories, etc.). In one example, the system may assume that each different sentence in the textual description refers to a different theme (each theme can be a different plotline, story, etc.) that can be found in the show (e.g., "Joey gets a job interview. Monica and Chandler have an argument"), and the textual description can be parsed by sentence, with each sentence of the representation becoming its own theme for further processing. In alternative embodiments, the narrative themes may be spelled out differently. For example, the program provider can supply a database listing the different narrative themes in the program, such as by keywords, and/or delimiting the different themes by different separators, etc.

At step 305, an iterative process can be performed for each expected theme. For each theme, the server 107 may perform, for example, the steps illustrated in FIG. 6. The FIG. 6 process, described further below, may take each theme identified in the prior step, identify the individual words in the theme's description, find the relevance intervals for each of those words (e.g., by accessing a database storing the relevance intervals of step 302), and combine the relevance intervals of each word into a composite relevance interval (e.g., a total interval) to result in the intervals/segments of the content in which the theme is found.

Once the relevance intervals for each theme have been determined, data can be stored (e.g., in a memory of server 107), or otherwise prepared, to identify each theme and its corresponding interval(s) within the show. At step 306, data may optionally be stored identifying each theme and the corresponding intervals within the show. In some embodiments, this may include creating and/or storing a data structure that has a record for each theme, and in each record there would be descriptive text for that theme (e.g., the words from the textual description corresponding to the theme), and data identifying the sentences/times in the show that are in that theme. The data structure could also include other data, such as a theme record handle/identifier, information related to the underlying relevance intervals forming the composite relevance interval for that theme, and other data related to the show, such as the name, filename, and/or some other identifier/descriptive data for the show. Once all the data has been stored, the stored data could be used as a basis for searching the content item based on theme. Additional details of the steps of FIG. 3 will be discussed throughout this document.

As discussed with respect to step 301 of FIG. 3, the system may receive or otherwise determine a transcript (e.g., a line-by-line script, record, or listing of the spoken words, etc.) of the content item (e.g., show, television program, etc.). In some arrangements, the transcript may be supplied with the content item and/or received in addition to the content. In other arrangements, the transcript may be determined and/or generated from the content item. For example, a speech recognition system may capture the words spoken in a content item. The content item may be processed, using the speech recognition system, to extract the spoken words and record the time at which each word occurs in the content item. The speech recognition system may also determine and record alternatives for extracted words or phrases, and may determine a probability for each determined alternative. The speech recognition system may also capture other aspects of the content item, including pauses and speaker changes.

An optical character recognition (OCR) system may also be used to generate a transcript (or some of the data included in a transcript). For example, an OCR system can capture words spoken in a content item, such as a video item, when the spoken words are displayed on-screen (e.g., as with subtitles, or closed captioning) or are otherwise visible during a playback of the content item. The OCR system may extract and record characteristics of the visible text such as the size, position, style and precise time interval of visibility.

A meta-data extraction module can also be used when generating a transcript. For example, a meta-data extraction module can capture embedded data of a content item, including filename, and meta-data of the content item, such as tagging information (e.g., MPEG-7 meta-tags, HTML tags, file header information, etc.). In some arrangements, the extracted information may be used as an indicator for important terms of the transcript. Similarly, summaries of content items (e.g., a capsule description of a television program for display in an electronic program guide) may also provide important terms of the content item, and can be used when generating the transcript.

Once the transcript has been obtained (e.g., supplied or generated), the transcript may optionally be processed by a word-adjustment module to increase the accuracy of the extracted data. Additionally, the transcript may be a combination of text extracted from different techniques (e.g., a transcript based on a two sets of extracted data, the first from a speech recognition system and the second from an OCR system; or a transcript based on a data from a speech recognition system and a supplied transcript; etc.).

A word-adjustment module, for example, may analyze a transcript sentence by sentence. Such an analysis may include determining grammatical information of the text, such as parts of speech, phrases, verb argument structure, clausal dependencies, and other features. In one example, the sentences may be analyzed according to sentence boundary (e.g., parsed based on punctuation, such as periods; parsed based on capital letters; etc.). Each sentence may be given its own unique index and the time of occurrence of the sentence may be associated with an analyzed (e.g., parsed) sentence.

In some arrangements, terms of the transcript may be processed into a canonical form. For example, the transcript may be processed to identify occurrences of the same or related words. In one example, the system may identify that the term "mouse" and "mice" are the singular and plural of the same concept, and should be treated as the same word. In a second example, the system may identify that the terms "New" and "York" and "City" are a multi-word expression "New York City" (e.g., when they appear next to each other in a transcript) and should be treated as a single term when the transcript is further processed/analyzed. In a third example, the system may identify proper nouns with occurrences of pronouns in the transcript (e.g., identify "Bob" with occurrences of "he", etc.) With respect to the illustrated transcript of Table 3, the terms "dog", "Spot" and "him" may be treated as referring to the same entity (e.g., "dog"), the terms "store" and "they" may be treated as the same term (e.g., "store"), and the terms "grocery" and "shopping" may be treated as a multi-word expression (e.g., "grocery shopping"). A thesaurus database can also be used to combine synonyms, such as "automobile" and "car," to treat them as the same word and help identify contextually related sentences.

In some embodiments, the transcript may be filtered to remove one or more terms. For example, the transcript may be filtered to leave only those terms that are determined to have significance and/or semantic meaning. The significance and/or semantic meaning of a term may be determined in various ways, including, for example, term-weighting techniques (e.g., term frequency-inverse document frequency (tf/idf), threshold pointwise mutual information (PMI) values with other terms in the vicinity, etc.), and other indicators of term salience. In one example, any occurrences of "the" and "a" may be filtered out. In a second example, certain nouns, verbs adjectives, adverbs, punctuation, etc. may be filtered out.

Table 1 illustrates an example transcript of a content item. As seen in Table 1, the transcript may contain a list of sentences (column 2). Each sentence may be associated with a unique label/index (column 1) and a time code that represent when the sentence occurs in the content item (column 3).

TABLE 1

| S_1 | Yesterday, I took my dog to the park. | 0:35 |
| S_2 | While there, I took him off the leash to get some exercise. | 0:39 |
| S_3 | After 2 minutes, Spot began chasing a squirrel. | 0:48 |
| S_4 | I needed to go grocery shopping. | 1:01 |
| S_5 | So I went later that day to the local store. | 1:04 |
| S_6 | Unfortunately, they were out of cashews. | 1:11 |

With the transcript successfully obtained and processed, the calculation of the relevance intervals can proceed. As discussed above with respect to step 302 of FIG. 3, each word or phrase appearing in the transcript can be processed to identify the relevance interval for the word. A word's relevance interval can identify one or more portions of the show (e.g., sentences or time before and after the word's appearance in the transcript) that are contextually relevant to the word. For example, a particular relevance interval may identify any number of sentences within the transcript that are relevant to a word. For example, the occurrence of the word "dog" in a television program transcript may, via the relevance interval calculation, be determined to be relevant to the sentence immediately previous to the occurrence of "dog" and the two sentences immediately following the occurrence of "dog." Put into other words, the relevance interval for the word "dog" identifies that "dog" is relevant to the previous sentence in the transcript and the two sentences following the occurrence of "dog." To calculate each relevance interval, a computer (e.g., server 107) may, for example, perform the steps illustrated in FIG. 4.

FIG. 4 is a flowchart illustrating an example method for calculating a relevance interval for a selected word, term and/or phrase. The method may be performed or repeated for each word or term in the content item's transcript. Relevance intervals for individual terms can be generated prior to handling the description, and without prior knowledge of the expected themes in the show. At step 401 of FIG. 4, the example method of calculating begins with initializing the relevance interval of the selected term (e.g., the first word in the first sentence of a transcript). For example, a term's initial relevance interval may simply be one sentence—the sentence in which the term appears. In some embodiments, initializing the relevance interval may include assigning it information relating to the sentence of the current term (e.g., assigning the current sentence index (e.g., an identifier or handle used to reference the sentence) and/or the time in the content item where the current sentence occurs).

Through the subsequent steps of the relevance interval calculation, the relevance interval may be modified to include a listing of other sentences or times that are relevant to the selected term. For example, the determination of the relevance interval for the selected term may be performed by traversing down the transcript (and up) to compare other sentences in the transcript with the selected term, and determining how contextually close (or contextually similar) those other sentences are to the selected term and/or to other terms in the sentence(s) where the selected term occurs. This can be done, for example, by doing a term-for-term comparison, successively comparing the current term with each term in the other sentence.

At step 403, it is determined whether the end of the transcript (or portion of content) has been reached (e.g., whether the last sentence of the transcript has been considered). If the process is not at the end of the transcript, then the method proceeds to step 405 and the next sentence is retrieved.

At step 407, upon retrieving the next sentence of the transcript, it is determined whether the next sentence is relevant to the current term. This determination can be performed in various ways. For example, the relevancy may be determined based on a comparison between the current term and each of the words in the next sentence. Similarity strengths for these term-by-term comparisons can be obtained from a similarity measurement database or other knowledge base, and totaled, averaged, or otherwise combined to yield an overall similarity strength between the current term and the next sentence. As one illustrative example, the selected word (e.g., "dog") can be compared with other terms appearing in the next sentence by forming a similarity measurement between the word "dog" and each term appearing in the next sentence, and deeming the next sentence relevant if the similarity measurement is sufficiently strong.

Similarity measurements may identify relationship strengths between pairs of words, and depending upon the type and other characteristics of the content item, take into account contextual information present in the transcript, as well as other contextual information drawn from an analysis of the content item. The types of contextual information used can vary and may depend upon the type and/or the characteristics of the content item (e.g., relevance intervals for a written document, a video with spoken words, a video with sung words, etc., may be calculated using different types of contextual information). For example, contextual information can include the clustering of the occurrences of information representations; the natural breaks in the media, such as paragraphs, changes in slides, verbal pauses, or speaker changes; natural language processing data, such as parts of speech, grammatical structure, multi-word expressions, named entities, and references; semantic information, such as synonyms, classifications, similarities, concepts related by knowledge based connections, and topic similarity; logical structure based upon transition words, prosodic cues, visual layout, surrounding formatting data (e.g., surrounding HTML), topic flow, and statistically measured continuity of topic; and other extracted data.

The similarity measurements can be used to determine whether the next sentence is relevant to the selected word. For example, continuing the above example, the comparison of the word "dog" to terms in the next sentence may include the calculation and/or retrieval of similarity measurements between "dog" and any (or all) of the other terms of the next sentence. In one example, the next sentence is deemed relevant if one or more of the retrieved similarity measurements are above a certain threshold. Various threshold comparison schemes can be used (e.g., determine whether one measurement is above a threshold value, determine whether two or more measurements are "strong," determine whether an average strength value exceeds a threshold value, etc.). In other arrangements, the next sentence may be relevant if the cumulative measurement is above a threshold.

The similarity measurements may be represented by statistical measurements of term co-occurrence in corpus data. In one example, a large amount of data may be selected as the corpus, such as, for example, a representative sample of sentences or newspaper articles. This corpus may then be processed to create the statistical measurements indicating a strength of the statistical relationship between finding the occurrence of one word (e.g., "dog") and also finding an occurrence of another word (e.g., "leash"). One can expect to find a stronger statistical relationship between some words (e.g., "dog" and "leash") than others (e.g., "dog" and "office").

One statistical measurement of term co-occurrence in corpus data may be a pointwise mutual information score that is calculated between a pair of terms (e.g., between a first term, A, and a second term, B, of the corpus data, where term A and term B form the pair of terms). One way to calculate a pointwise mutual information score is to, for each pair of terms, create a table that tabulates the number of times that each term occurs in the corpus and the number of times term of a pair occurs within a predetermined distance of the other term of that pair. In other words, this table records the number of times that two terms co-occur within a window of constant size in the corpus. Using the terms "dog", "leash" and "cubicle" as an example, "dog" may occur 10,000 times in a corpus of 10 million words, "leash" may have occur 500 times in that same corpus, and "dog" and "leash" may occur 100 times within 10 terms of each other. Cubicle may also occur 100 times in the corpus but "dog" and "cubicle" may occur only 8 times within 10 terms of each other. From this data, the pointwise mutual information scores between pairs of terms can be calculated. One formula for calculating the mutual information score may be:

Let PMI(S,P) be the pointwise mutual information score between term S and term P. Let N be the number of words in the corpus. Let #S be the number of occurrences of term S in the corpus, let #P be the number of occurrences of term P in the corpus, and let #S&P be the number of times term S occurs within K terms of term P. Then $MI(S,P)=\log_2((N)R\#S\&P/[\#S][\#P])$.

Measures of association or similarity between terms can also be calculated using other similarity measurement techniques, including, for example, Dice coefficient, chi-square statistics, log-likelihood rations, WordNet-based similarity, Wikipedia Miner similarity, Google similarity distance, etc.

In some embodiments, similarity measurements may be stored in a knowledge base (e.g., database). The similarity measurement database may contain, for example, a large listing of terms, and for each term, the database may list a number of contextually-related terms along with a strength value for the match. So, for example, an entry for the word "dog" may list "park", "bone", "leash" and "owner" (among others), and may include a strength value for the contextual relationship between "dog" and each of the listed words. The strength value can be stronger for words like "leash" and "bone", since those terms quite often relate to dogs, while the strength value for words like "park" and "owner" may be lower, since those terms are often used in other contexts that don't involve dogs. Any desired type of similarity measurement database may be used.

When comparing the relevance of the next sentence to the current term, a particular statistical measurement may be retrieved from the database by providing a query including the two terms of the desired similarity measurement. For example, the query could include the term under consideration (e.g., the current term), and a term from the next sentence (e.g., a query including "dog" and "leash" would return the similarity measurement between those terms).

Another way to measure the relevancy is to compare other (or all) words in the sentence of the current term with words of the next sentence. This process can include gathering the similarity measurements between any (or all) of the terms in the two sentences. Once the similarity measurement(s) are gathered, the similarity strength between the two sentences may be calculated, for example, by summing and/or taking the product of the gathered similarity measurements, and then normalizing by the resulting number. In some instances, outlying (e.g., extreme) values may be discarded before performing the summation and/or product. Additionally, the similarity measurements may be normalized before performing the summation and/or product.

As another example, the relevance may be determined based on an analysis of the terms of the sentences. In one example, the relevancy may be based on a pronoun resolution determination (e.g., if the sentences are about the same noun, the sentences may be relevant). In one instance, a first sentence may include the noun "Spot" and the second sentence may include the pronoun "he" which may be resolved to be referring to "Spot." These sentences may be deemed relevant, since the pronoun in the subsequent sentence refers back to the proper noun in the prior sentence. In another example, the relevancy may be based on the occurrence of a discourse phrase that indicates a continuation or the ending of an interval (e.g., the phrase "In addition" may indicate a continuation, while the phrase "In other news" may indicate the intervals ends).

If the sentence is not relevant to the current term, the method can return to step 403, to determine if this sentence is the end of the transcript, and to continue with checking the next sentence in the transcript. Alternatively, if the next sentence is not deemed relevant, then the system can conclude that the term's relevance in this direction has ended, and the process can cease the downward traversal, and proceed to step 411 for the upward traversal through the transcript. Additionally and/or alternatively, the process may proceed to step 411 if a threshold number of sentences have been determined to be not relevant. In one example, the process may proceed to step 411 if a threshold of consecutive sentences have been determined to be not relevant (e.g., if the previous sentence and the current sentence is not relevant, proceed to step 411). Otherwise, the process may proceed to step 403. In another example, a counter may be incremented for every not relevant sentence and if the counter reaches a threshold (e.g., 4, etc.), then the process proceeds to step 413. Otherwise, the process may proceed to step 403.

Figure 5:
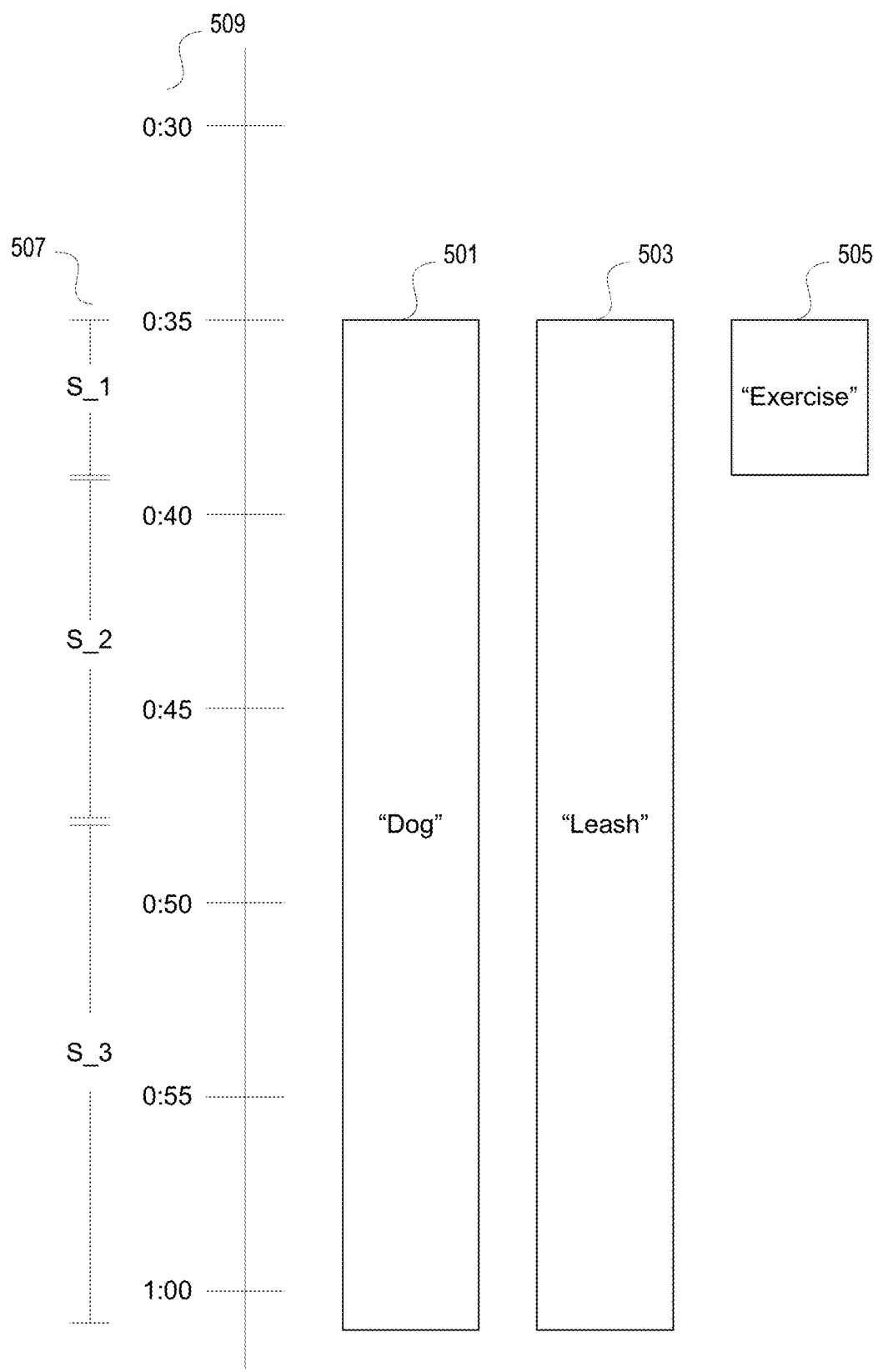
FIG. 5 is a graphical illustration of relevance intervals according to one or more aspects described herein.

On the other hand, if the sentence was determined to be relevant, the method can proceed to step 409, where that sentence is added to the current term's relevance interval. To add the sentence to the relevance interval, the relevance interval is modified with the appropriate information of the sentence. For example, the relevance interval for the current term may be a list of sentences, sentence labels/indexes, time periods, some combination thereof, etc. associated with that current term. In one example, if the interval for a term is stored as a list having copies of relevant sentences, then the terms of the next sentence may be added to the relevance interval list for the current term. In another example, if the relevance interval for a term is stored according to sentence labels/indexes (e.g., a relevance interval spanning sentence 1, sentence 2 and sentence 3, may be described by a start value of 1 and an end value of 3), the appropriate index value can be updated (e.g., start value may be decremented, end value may be incremented, etc.) to list the relevant sentences according to their indices. In a third example, if the relevance interval is stored as a time value (e.g., time period within a piece of content), then the appropriate start or end value of the relevance interval may be augmented by adding the time values for the next sentence (e.g., making the end time of the next sentence the end time of the interval). Table 2, found below, and FIG. 5 illustrate example relevance intervals.

At step 410, a determination is made whether to continue calculating the current relevance interval. In some embodiments, the method may proceed to step 403 if the next sentence was added to the relevance interval in step 409. Otherwise, if the next sentence was not added, the method may proceed to step 411. In other embodiments, the method may always proceed to step 403. In yet other embodiments, the method may proceed to step 411 after two or more consecutive sentences have not been added to the current relevance interval (allowing for short gaps in conversation topic without cutting short the relevance interval).

If, at step 403, it is determined that the end of the transcript has been reached, the method proceeds to step 411, where the sentence of the current term is located (similar to step 401). At step 413, it is then determined whether this location is the beginning of the transcript (since the upwards traversal would end at the beginning of the script). If this location is the beginning of the transcript, then the method ends. Otherwise, the method proceeds to step 415, where the previous sentence in the transcript is retrieved. At step 417, upon retrieving the previous sentence, it is determined whether the previous sentence is relevant to the current term, which may be performed similarly to the determination of step 407. If the previous sentence is relevant, the previous sentence is added to the relevance interval at step 419. Otherwise, the method may proceed directly to step 413 to determine whether this previous sentence is the beginning of the transcript. At step 420, another determination is made whether to continue calculating the current relevance interval. This determination may be similar to the determination made at step 410.

Accordingly, the process illustrated by FIG. 4 may be repeated until the relevance intervals for the desired terms (e.g., all terms, phrases, or canonical terms or phrases in the transcript) have been calculated. Once calculated and/or processed (e.g., post-processed, as described below), the relevance intervals and other data related to the relevance intervals may be stored in a database (e.g., relevance interval database 102 of FIG. 1).

Additionally, in some arrangements, the relevance intervals may be subject to additional, or post-processing. In some embodiments utilizing post-processing, the relevance intervals may be indexed for easier retrieval. For example, words may appear multiple times in a document and, thus, may also have multiple relevance intervals. To facilitate quicker retrieval of the relevance intervals, the relevance intervals for a transcript may be indexed by the term for which the relevance intervals were calculated. The relevance intervals may be searched by term to retrieve any and/or all of the relevance intervals associated with that term. In other embodiments utilizing post-processing, the relevance intervals may be merged. For example, if two relevance intervals for a term are sufficiently close (e.g., the end of the first relevance interval lies within a predetermined number of sentences from the start of the second relevance interval), the two relevance intervals may be merged.

Table 2 illustrates three example relevance intervals that may be calculated from the transcript illustrated in Table 1. As shown in Table 2, each relevance interval is given a label according to the term for which it was calculated, the sentence in which the term occurred, the start and end sentence for the interval (e.g., sentence boundary), and the start and end time of the content item for the interval (e.g., the start and end time-codes of the sentence in the content item).

TABLE 2

| Term | Term Sentence | Sentence Begin | Sentence End | Time Begin | Time End |
|---|---|---|---|---|---|
| Dog | S_1 | S_1 | S_3 | 0:35 | 1:01 |
| Leash | S_2 | S_1 | S_3 | 0:35 | 1:01 |
| Exercise | S_2 | S_2 | S_2 | 0:39 | 0:48 |

FIG. 5 is a graphical illustration of relevance intervals. Specifically, the example of FIG. 5 is a graphical illustration of the relevance intervals included in Table 2. As seen in FIG. 5, the relevance interval for "Dog" is interval 501, which spans three sentences (S_1, S_2 and S_3) and 25 seconds of the program (from the 35 second mark to the one minute mark); the relevance interval for "Leash" is interval 503; and the relevance interval for "Exercise" is interval 505. Each illustrated relevance interval spans a particular time of the content item and/or sentences of the transcript. The illustration of FIG. 5 provides indications of the sentences of the transcript 507 and the time-codes of the content item 509.

As discussed above with respect to step 303 of FIG. 3, the system may receive information identifying different narrative themes. In one or more embodiments, this information may be represented as a textual description. The description may include different terms and/or sentences that are meant to describe different narrative themes and/or portions of the content item. A narrative theme or portion of the description may be meant to summarize and/or otherwise encapsulate related events within the content item. For example, a narrative theme may describe a plot line, plot point, a plot device, or other narrative theme of a content item, such as a television show, song, movie, etc. (e.g., a first portion of a "60 Minutes" episode called "Congress's New Tax Proposal," a second portion called "The Killer Who Got Away," and a third portion called "The NFL's Mystery Man"). As another example, a narrative theme may describe an emotional theme of a content item, or other thematic characteristic of the content item. In addition, a narrative theme can relate to marketing, advertisement, educational, or other themes.

It is noted that what can be considered a narrative theme of a content item (e.g., the plot lines of the content item, etc.) can vary. Thus, the received description may take various forms. For example, the description of a television episode may be supplied by one or more viewers (e.g., a social networking site, or other website, may allow individual users to post their own summaries of the television episode). Because each viewer is free to describe the piece of content (e.g., an episode of a show) as they interpret it, their description may differ from the descriptions of other viewers, even when they are describing similar events of the television episode. Descriptions could also be supplied by a content supplier or provider. In one instance, a description supplied by a content provider may be a summary for inclusion into an electronic programming guide, or some other description associated with an existing service of the content provider. Just as descriptions among different viewers may describe a content item differently, descriptions supplied by a content supplier may also differ from those supplied by a viewer. Therefore, a wide range of possible descriptions could be received for a content item, and different sets of relevance intervals and theme segments can be identified using the different descriptions.

Table 3 illustrates a sample textual description that includes one or more narrative themes of a content item. Specifically, the example description includes narrative themes for a television show.

TABLE 3

| |
|---|
| Character A changes her name. Character B searches for a job. Characters C and D look for a house. |

As illustrated in Table 3, the textual description includes three sentences. In the illustrated description, each sentence describes a plot line for the television show. To separate each plot line, for example, the illustrated text could be parsed by sentence. In some arrangements, the description could be processed differently than just by sentence to identify the themes or theme sentences. For example, processing of the description could be based on other (or additional) grammar structural cues of the text (e.g., parsed based on punctuation, such as commas, semi-colons, etc.). Upon separating the description into the different theme sentences, each sentence may optionally be given its own unique index.

Table 4 illustrates an example of a textual description that has been processed into one or more themes. As seen in Table 2, each theme includes a single sentence of the descriptive text illustrated in Table 1. The first sentence is the first theme, the second sentence is the second theme, and the third sentence is the third theme. Each theme has been given its own unique index (e.g., T_1, T_2, T_3).

TABLE 4

| | |
|---|---|
| T_1 | Character A changes her name. |
| T_2 | Character B searches for a job. |
| T_3 | Characters C and D look for a house. |

With each theme identified, the system can seek to find where the terms of each theme appear in the transcript and/or identify the relevance intervals for those terms. As discussed above in connection with step 305 of FIG. 3, a total interval is determined for each theme. For example, the relevance intervals of each word in a theme description can be combined into a composite relevance interval (e.g., a total interval), which can represent an interval for the theme.

Figure 6:
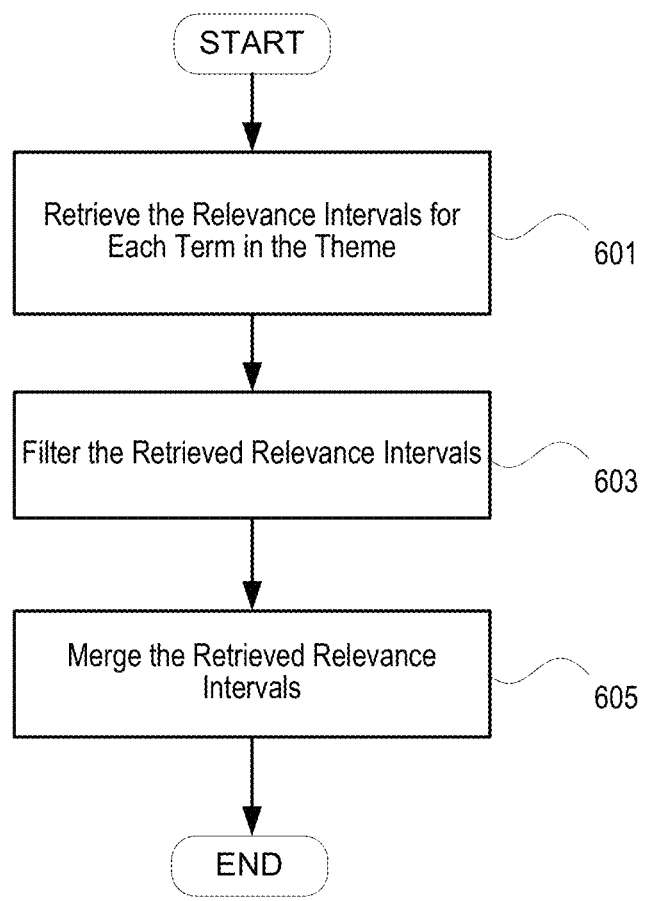
FIG. 6 is a flowchart illustrating an example method for determining an interval for a theme based on the relevance intervals for each word in the theme according to one or more aspects described herein.

FIG. 6 is a flowchart illustrating an example method for determining an interval for a theme based on the relevance intervals for each word in the theme. In some embodiments, this method may be part of an iterative process that is repeated for each theme determined from the textual description (e.g., the themes identified at step 304 of FIG. 3).

As seen at step 601 of FIG. 6, the relevance intervals for each term in the theme are retrieved (e.g., from the relevance interval database 102 of FIG. 1). In some embodiments, only the relevance intervals with terms matching each term will be retrieved (e.g., via a query requesting all relevance intervals for the term "dog"). In other embodiments, relevance intervals having terms that are similar to one of the theme's terms may be retrieved. For example, each term in the theme can be processed through a thesaurus to identify synonyms for each term. Upon retrieving the synonyms, all relevance intervals that match the current term and the synonyms of the current term can be retrieved (e.g., via one or more queries requesting relevance intervals for the word "leash" and the synonyms of "leash" such as "cord" and/or "chain", etc.).

Figure 7A:
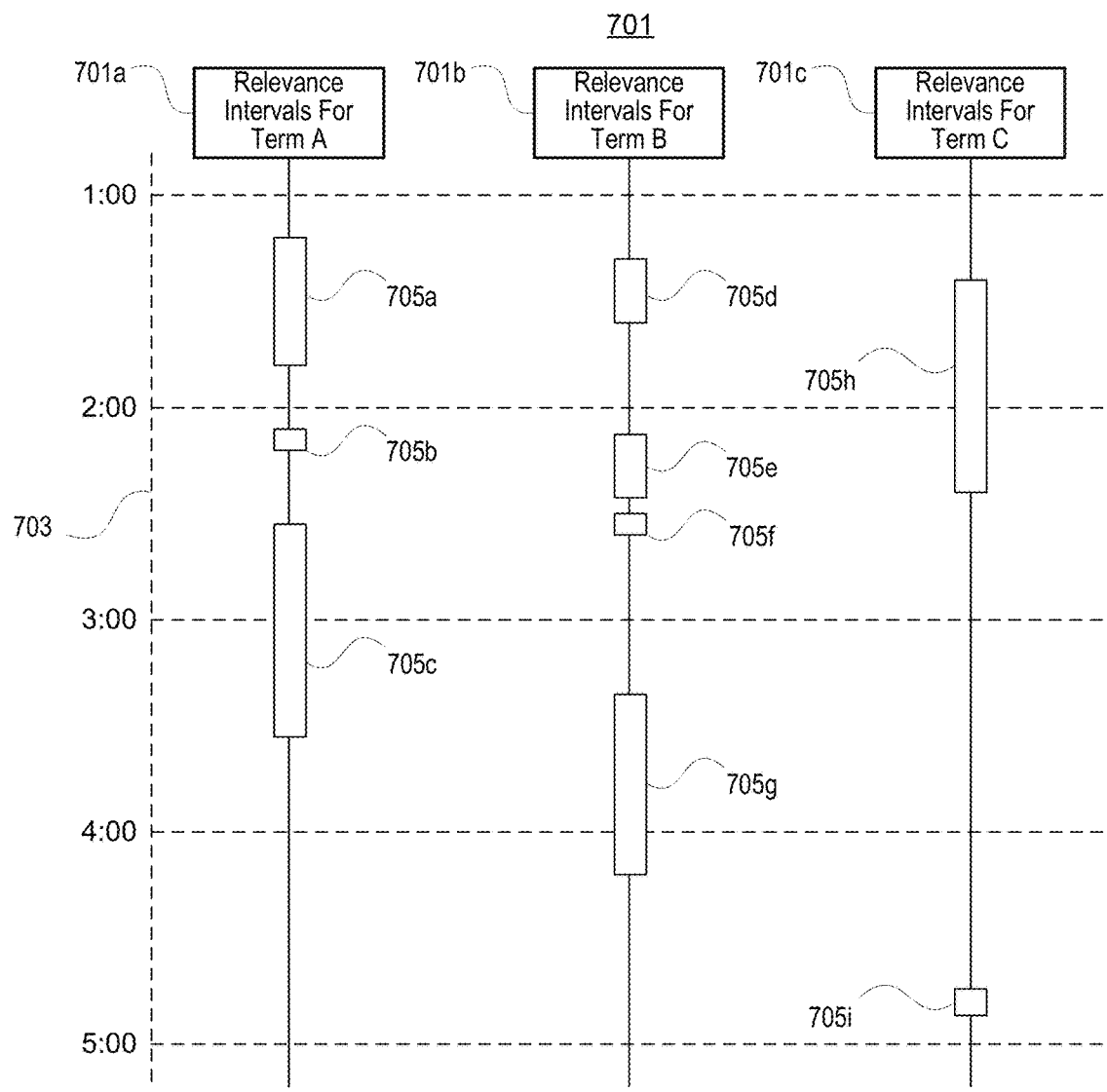
FIG. 7A is a graphical illustration showing an example of relevance intervals that have been retrieved based on terms in a theme according to one or more aspects described herein.

FIG. 7A is a graphical illustration showing an example of relevance intervals that have been retrieved based on terms in a theme. In the example illustrated in FIG. 7A, the relevance intervals for each term of a theme have been retrieved from a database storing the relevance intervals for the content item. The illustrated theme includes three terms, Term A (e.g., "Character A" of theme T_1 of Table 4, which is treated by the system as a single word), Term B (e.g., "changes" of thematic element T_1 of Table 4), and Term C (e.g., "name" of thematic element T_1 of Table 4). As seen in the illustration, FIG. 7A displays relevance intervals 701 corresponding to only a portion of the content item. Specifically, as seen by line 703 of FIG. 7A, the Figure illustrates relevance intervals 701 that begin after 1:00 and end before 5:00 of the content item, while those occurring, beginning, and/or ending outside this portion of the content item are not shown. For illustration purposes, relevance intervals 701 have been illustrated in three portions. The first portion 701a are the relevance intervals retrieved based on Term A, the second portion 701b are the relevance intervals retrieved based on Term B, and the third portion 701c are the relevance intervals retrieved based on Term C. Thus, relevance intervals 705a-705i are illustrated in FIG. 7A. The top of a relevance interval represents the beginning of the relevance interval. The bottom of the relevance interval represents the end of the relevance interval. For example, relevance interval 705a, which is a relevance interval retrieved based on Term A, begins at approximately 1:15 of the content item and ends at approximately 1:45 of the content item.

Referring again to FIG. 6, at optional step 603, the relevance intervals retrieved based on the terms in the theme can be filtered. The relevance intervals may be filtered using various techniques, some of which include filtering the relevance intervals based on one or more characteristics of the relevance intervals. For example, the relevance intervals may be filtered based on the size (or length) of each relevance interval ("size filtering"). In one instance, any relevance interval that has a size less than a predetermined size (e.g., a size of 5 seconds, etc.) may be removed from the retrieved set of relevance intervals (e.g., remove relevance intervals 705b, 705f and 705i of FIG. 7A from relevance intervals 701). The size of a relevance interval may be the time spanned by the relevance interval (e.g., the difference between the end of the relevance interval and the beginning of the relevance interval). Alternatively, the size of a relevance interval may be the number of sentences spanned by the relevance interval.

As another example, the relevance intervals may be filtered based on a comparison between different relevance intervals. Comparison filtering may take the form of overlap filtering and/or adjacency filtering. Overlap filtering may include determining that multiple relevance intervals overlap with each other in the content, and removing relevance intervals that do not overlap (e.g., remove relevance interval 705i from relevance intervals 701 of FIG. 7A, but not 705g because 705g overlaps with 705c). Additionally, overlap filtering may remove any relevance interval that does not overlap with a threshold number of other relevance intervals (e.g., in an example with a threshold of 2, remove relevance interval 705i and 705c from relevance intervals 701 of FIG. 7A, because 705i does not overlap with any other relevance interval and 705c only overlaps with 705c but not a second relevance interval).

Adjacency filtering may include determining whether another interval is near a particular relevance interval, and removing the relevance interval if there are no nearby relevance intervals. For example, determining whether another interval is near may include comparing the start and end times of the relevance intervals to determine if at least one relevance interval ends or begins within a threshold time of the start and end time of the particular relevance interval (e.g., remove relevance interval 705i from relevance intervals 701 of FIG. 7A, but not 705f, because the start of interval 705f is sufficiently near to the end of interval 705e).

As yet another example, relevance intervals may be filtered using a hybrid technique. A hybrid technique can be a combination different filtering techniques, such as a combination of size filtering and comparison filtering, as described above. In one instance, relevance intervals may be filtered based a sliding scale between relevance interval size and the relevance interval comparison. In one sliding scale technique, the larger the size of the relevance interval, the less the relevance interval needs to overlap or be near another relevance interval (e.g., intervals 705f and 705g of FIG. 7A are candidates for removal because they only overlap with one other relevance interval, but relevance interval 705f is removed from relevance intervals 701, while 705g remains, because 705g is larger). Similarly, as a relevance interval overlaps with, or is near, a greater number of relevance intervals, the smaller the threshold size may become (e.g., intervals 705b, 705f and 705i of FIG. 7A are candidates for removal because their size is less than a threshold value, but intervals 705f and 705i are removed from relevance intervals 701, while 705b remains, because 705b overlaps with two other relevance intervals).

Figure 7B:
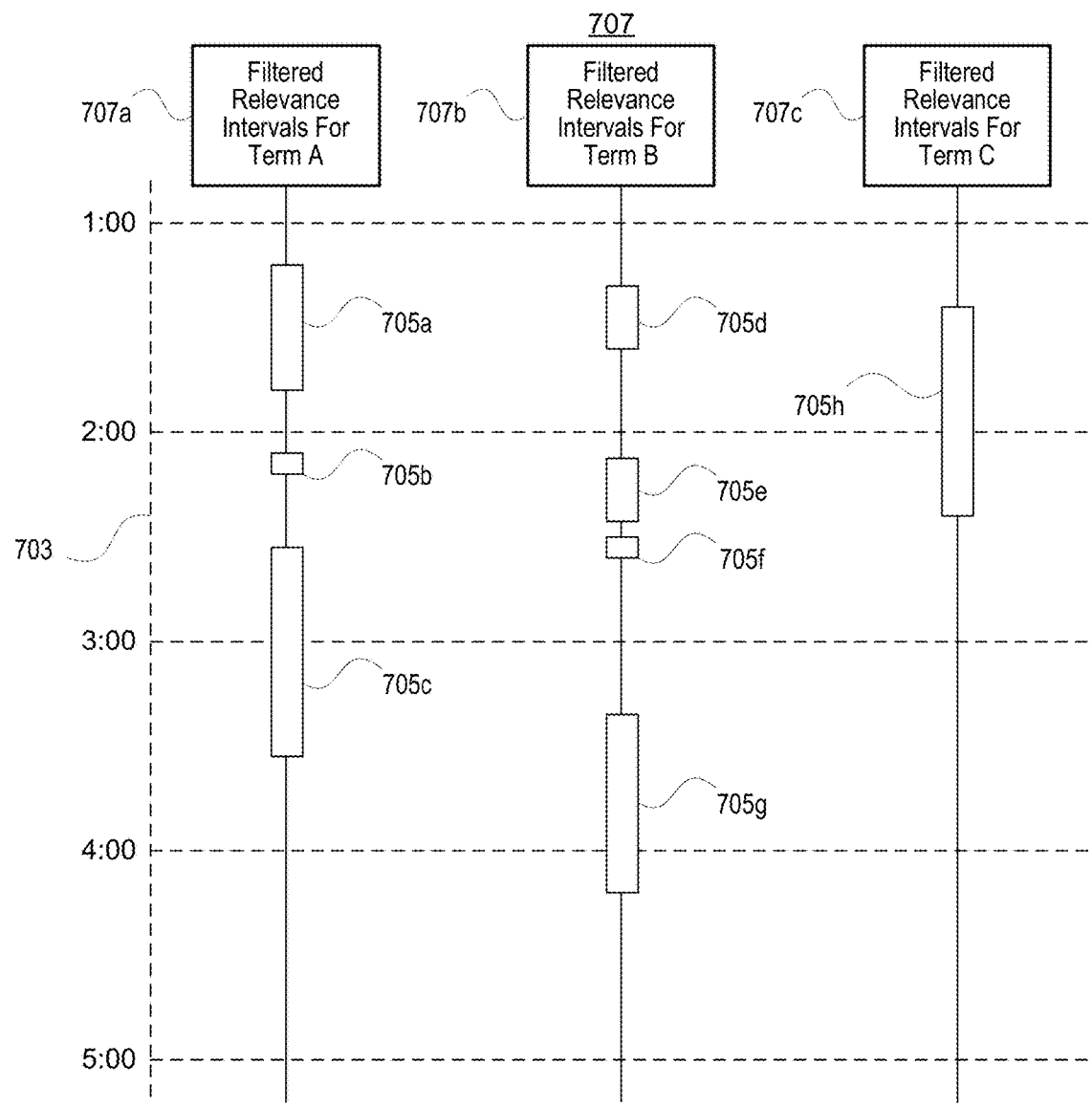
FIG. 7B is a graphical illustration showing an example of relevance intervals retrieved for each term of a theme after they have been filtered, according to one or more aspects described herein.

FIG. 7B is a graphical illustration showing an example of relevance intervals retrieved for each term of a theme after they have been filtered. As illustrated, FIG. 7B illustrates the relevance intervals of FIG. 7A after they have been filtered. The results of the filtering process are illustrated in FIG. 7B as filtered relevance intervals 707. Filtered relevance intervals 707 are illustrated in three portions: first portion 707a, second portion 707b, and third portion 707c. As compared to relevance intervals 701 of FIG. 7A, only relevance interval 705i of FIG. 7A was removed from relevance intervals 701. One filtering technique that may produce the filtered relevance intervals 707 illustrated in FIG. 7B includes a hybrid technique that filters based on a combination of three techniques: size filtering, overlap filtering and adjacency filtering. Using this hybrid technique, relevance intervals 705b, 705f and 705i are candidates for removal because of their size. Relevance interval 705b remains because it overlaps with 705e and 705f; relevance interval 705f remains because it is near 705e. All other relevance intervals (e.g., relevance intervals 705a, 705c, 705d, 705e, 705g, and 705h) remain because they are of a sufficient size and/or overlap and/or are near a sufficient number of other relevance intervals.

Referring again to FIG. 6, at step 605, the retrieved (and possibly filtered) relevance intervals may be merged or otherwise combined. Relevance intervals can be merged using various techniques. For example, the relevance intervals may be merged based on overlap between relevance intervals. In one instance, a relevance interval is merged into another relevance interval if the two relevance intervals overlap (e.g., relevance interval 705a and 705d of FIG. 7A may be merged into a single interval, etc.)

As another example, the relevance intervals may be merged based on the adjacency of the relevance intervals (e.g., relevance interval 705f and 705e of FIG. 7A may be merged into a single interval, etc.). A relevance interval can be merged into another relevance interval if the two relevance intervals are sufficiently near each other (e.g., relevance interval 705e may be merged with 705f of FIG. 7A because the end time of 705e is within a threshold number of seconds to the start time of 705f). In some arrangements, merging relevance intervals based on the adjacency of the matching relevance intervals may include merging the adjacent intervals such that the resulting merged interval spans from the beginning of the earliest relevance interval to the end of the later relevance interval (e.g., from the beginning of 705e of FIG. 7A to the end of 705f). This may cause the merged relevance interval to include the gap between the adjacent relevance intervals (e.g., the merged relevance interval includes the gap from the end of 705e of FIG. 7A to the beginning of 705f).

Additionally, the merging process may continue by merging a merged relevance interval with another relevance interval. For example, two relevance intervals may be merged (e.g., relevance interval 705a and 705d of FIG. 7A are merged). Then, the merged relevance interval and a third relevance interval may be merged (e.g., the merged interval of 705a and 705d is merged again with interval 705h).

Figure 7C:
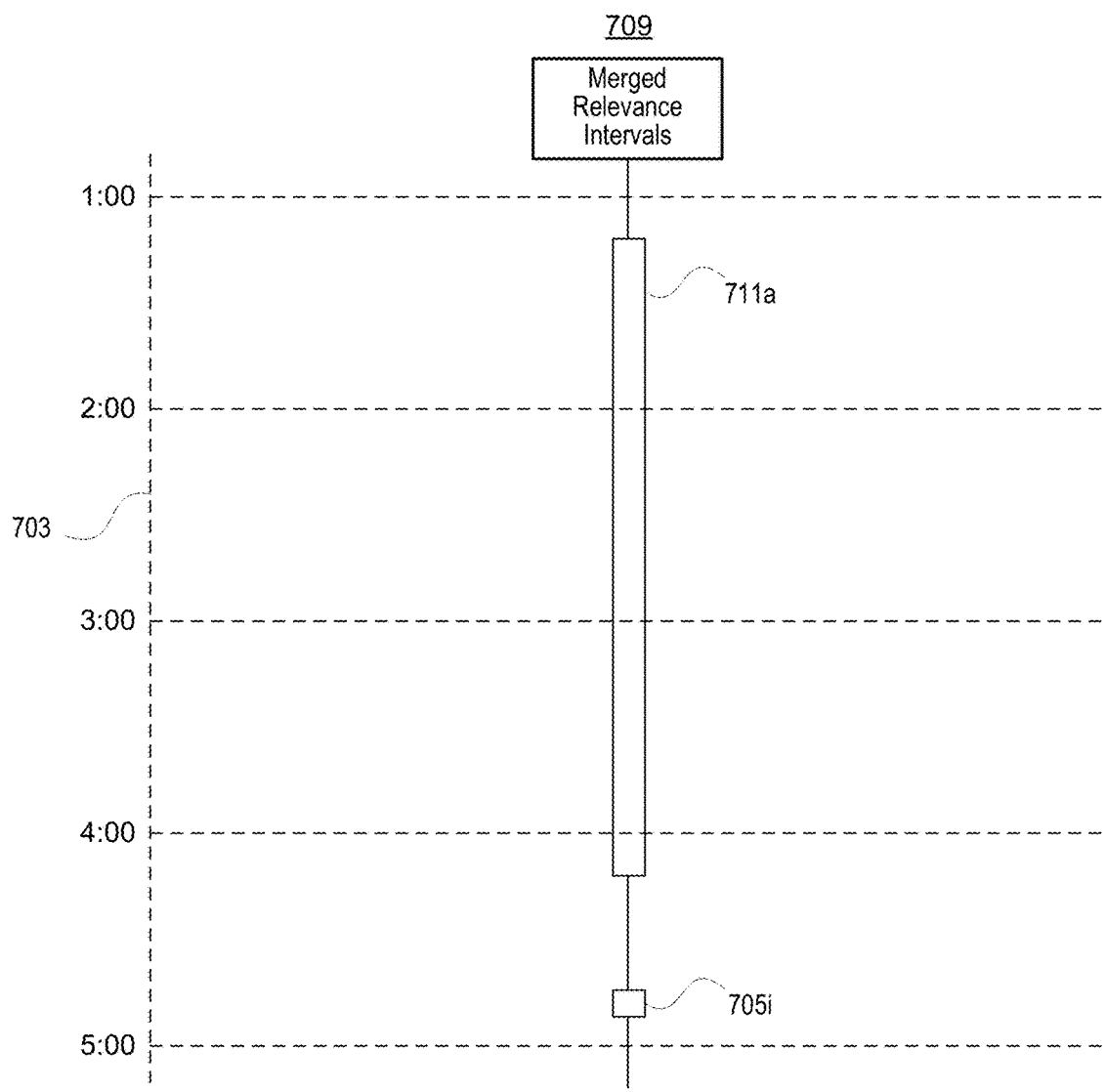
FIG. 7C is a graphical illustration showing an example of relevance intervals that have been merged, according to one or more aspects described herein.

FIG. 7C is a graphical illustration showing an example of relevance intervals that have been merged. As illustrated in FIG. 7C, relevance intervals 701 of FIG. 7A have been merged into merged relevance intervals 709. As seen in FIG. 7C, relevance interval 711a and relevance interval 705i are part of merged relevance intervals 709. Compared to the intervals illustrated in FIG. 7A, relevance interval 705i was not merged with any relevance interval. Relevance interval 711a is a merged relevance interval. One merging technique that may produce relevance interval 711a includes a hybrid technique that merges based on a combination of two techniques: overlap merging and adjacency merging. With respect to relevance intervals 701 of FIG. 7A, relevance intervals 705a-g are merged to create relevance interval 711a because all intervals of 705a-g overlap or are near another internal (e.g., interval 705a, 705d and 705h all overlap with each other and they may be merged) and/or an intermediate merged interval (e.g., interval 705c overlaps with the merged interval that results from merging intervals 705e and 705f, and they may be merged). Relevance interval 705i is not merged with another relevance interval, because interval 705i does not overlap with any other relevance interval (or any resulting merged relevance interval) and is not sufficiently near any other relevance interval (or any resulting merged relevance interval).

Referring again to FIG. 6, the relevance intervals resulting from the merging at step 605 can be treated as the total interval for the current theme. Accordingly, in some arrangements, the total interval for a theme depends on whether the relevance intervals retrieved based on the terms of a theme have been filtered and/or merged. If neither filtering nor merging was performed, the total interval may include all relevance intervals retrieved based on the theme's terms (e.g., relevance intervals 701 of FIG. 7A). If filtering was performed, the total interval for the theme may include the relevance intervals retrieved based on the theme's terms, minus some intervals that were filtered out (e.g., the filtered relevance intervals 707 of FIG. 7B). If merging was performed, the total interval for the theme may include the merged relevance intervals (e.g., the matching relevance intervals 709 of FIG. 7C). If filtering and merging were performed, the total interval of the theme may include the relevance intervals that result from filtering and merging the relevance intervals retrieved based on the terms of the theme (not shown).

Figure 8A:
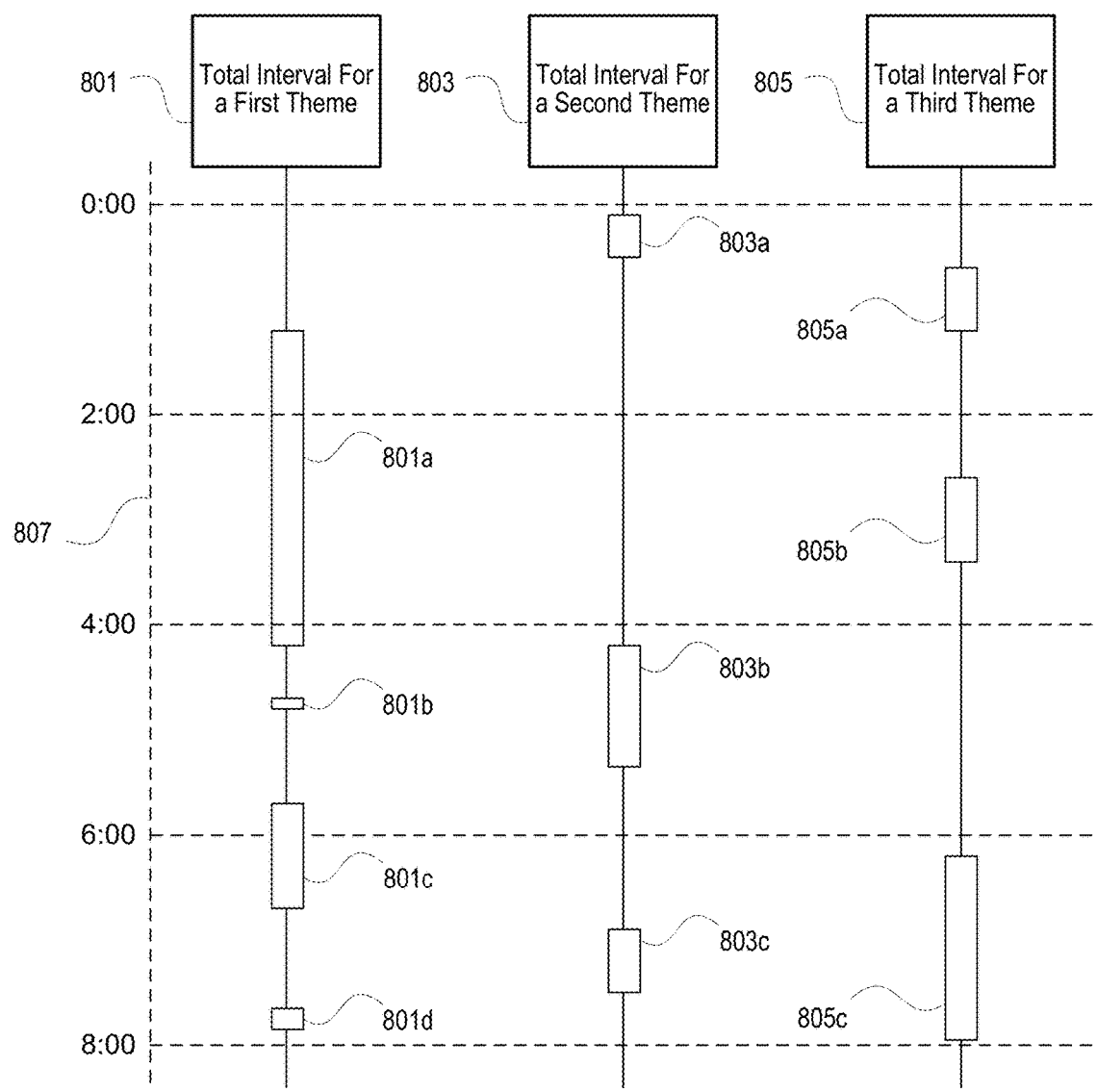
FIG. 8A is a graphical illustration showing example total relevance intervals for different themes according to one or more aspects described herein.

As discussed above, the process illustrated in FIG. 6 may be repeated iteratively (e.g., for each theme identified from a textual description). FIG. 8A is a graphical illustration showing example total intervals for different themes. Specifically, FIG. 8A illustrates the total intervals for three different themes (e.g., themes T_1, T_2, T_3 of Table 4). The first total interval 801 is for the first theme (e.g., T_1 of Table 4), the second total interval 803 is for the second theme (e.g., T_2 of Table 4), and the third total interval 805 is for the third theme (e.g., T_3 of Table 4). As seen in the illustration, FIG. 8A displays the total intervals 801, 803, 805 for only a portion of a content item. Specifically, as seen by line 807 of FIG. 8A, the portion(s) of the total intervals that begin after 0:00 and end before 8:00 of the content item are illustrated, while those occurring/beginning/ending outside this portion of the content item are not shown. Thus, sub-intervals 801a-d, 803a-c, and 805a-c are illustrated in FIG. 8A.

In some arrangements, the total intervals (e.g., intervals 801, 803, 805 of FIG. 8A) may be subject to further processing. For example, the total intervals for the themes may be filtered. The total intervals may be filtered using techniques similar to those described above with respect to filtering the relevance intervals of a single theme (e.g., size filtering, adjacency filtering, overlap filtering, hybrid filtering, etc.). Similarly, the total intervals may also be filtered using a modified technique (e.g., modified overlap filtering, etc.) In one example, modified overlap filtering may include determining intervals from the total intervals that overlap and then removing the smallest of any overlapping interval. In another example, modified overlap filtering may include determining intervals from the total intervals that overlap and then filtering based on the size of the overlap and/or the size of the relevance interval. In one such instance, the larger a relevance interval, the greater the overlap with another interval is required to be before it is filtered (e.g., a sub-interval of a total interval with a size of 30 seconds may need to overlap for greater than 20 seconds with another sub-interval before it will be removed, while a sub-interval with a size of 10 seconds may need to overlap for greater than 2 seconds with another sub-interval for it to be removed from the total intervals). With respect to the illustrated example of FIG. 8A, sub-interval 801c is removed because it does not overlap with 805c enough, while 805b, 803c and 801d all remain. Such overlap filtering may be performed because themes of some content items may be unlikely to overlap.

Additionally or alternatively, the total intervals may be filtered based on the content item. In one example, the total interval may be filtered based on the location (e.g., time, sentence, etc.) of a sub-interval with respect to the content item ("location filtering"). In another example, the location of a sub-interval may determine how aggressive the filtering constraints are applied. Thus, in one example, relevance intervals located later in the content item may be filtered less aggressively than relevance intervals located earlier in the content item (e.g., overlapping intervals are not removed if they occur later in the content item, but are removed if they occur earlier in the content item). With respect to the illustrated example of FIG. 8A, any sub-interval occurring after 4:00 of the content item may not be removed (e.g., sub-intervals 801*b*, 801*c*, 801*d*, 803*b*, 803*c* and 805*c* are not removed because they occur after 4:00), while any sub-interval occurring before 4:00 will be subject to particular filtering constraints, such as overlap filtering, size filtering, etc. Such techniques may be performed because some content items may have converging themes towards the end of the content item.

The total intervals may also be filtered based on the themes. For example, the segments of relevance may be filtered based on the relatedness of the themes to each other ("relatedness filtering"). In one example, a first theme may be compared to a second theme to determine a relatedness score based, for example, on how closely related the terms are to one another in the respective theme descriptions (in other words, based on how different the themes are from one another—if themes are closely related, then the merging of relevance intervals to determine whether a sentence belongs to a first or second theme may require a higher relevance score between the term and neighboring terms that are deemed to be in the theme). Upon determining the relatedness score, total intervals of the themes may be filtered based on the relatedness score. In one instance, the magnitude of the relatedness value determines how aggressively the total intervals are filtered (e.g., a higher relatedness value would cause less to be filtered, a lower relatedness value would cause more to be filtered, etc.). In one example, the relatedness value between two themes may include calculating a similarity measurement (e.g., pointwise mutual information (PMI), WordNet-based similarity measures, Wikipedia Miner similarity measures, some combination thereof, etc.) that measures how inter-related the terms of the themes are to each other (these measurements may be combined into a single measurement). Additionally or alternatively, the relatedness value and/or the similarity measurements may be normalized (e.g., normalized to be within a range from zero to one), and/or bounded (e.g., set to zero if negative, set to one if greater than one, etc.). The magnitude of the similarity measurement may determine whether certain filtering techniques will be applied between the two total intervals. For example, if the similarity measurement is less than a threshold value, then any overlapping sub-intervals may be filtered based on size (e.g., the smallest of the overlapping sub-intervals will be removed, any overlapping sub-interval less than a threshold size will be removed, any sub-interval that is completely overlapped by a larger sub-interval will be removed, etc.). As another example, if the similarity measurement is greater than the threshold, then no further filtering may be performed (e.g., overlapping sub-intervals are not removed). With respect to the illustrated example of FIG. 8A, if a similarity measurement of the themes for total intervals 801 and 803 are less than a threshold, 801*b* may be removed because it overlaps with 803*b*. If the similarity measurement of the themes for total intervals 801 and 803 is greater than a threshold, 801*b* may remain despite its overlap with 803*b*. Filtering techniques similar to these may be performed because themes that are related may overlap in some content items.

Figure 8B:
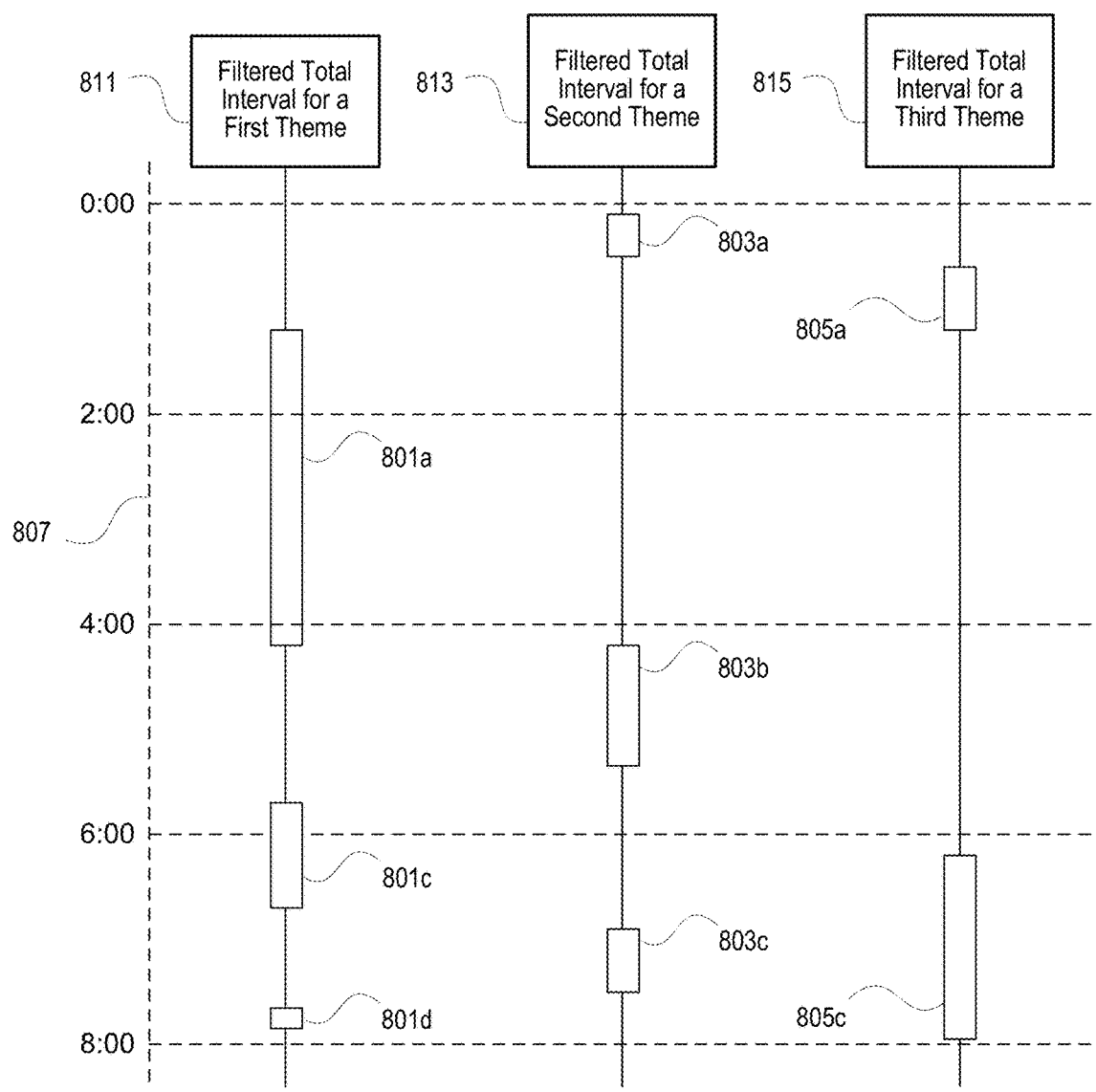
FIG. 8B is a graphical illustration showing example total intervals after filtering has been performed according to one or more aspects described herein.

FIG. 8B is a graphical illustration showing example total intervals after filtering has been performed on the sub-intervals. As illustrated, the total intervals of FIG. 8A (e.g., total intervals 801, 803, 805 of FIG. 8A) have been filtered into the filtered total intervals of FIG. 8B (e.g., intervals 811, 813, 815 of FIG. 8B). One filtering technique that may produce the filtered total intervals 811, 813, 815 as illustrated in FIG. 8B includes a hybrid technique that filters based on location of the sub-intervals and uses a modified overlapping filtering process. Using this hybrid technique, sub-intervals 803*a* and 805*a* remain because they do not overlap any sub-interval; sub-intervals 801*a* and 803*b* remain because they were greater than any sub-interval that they overlapped with (e.g., 801*a* overlapped with 805*b* of FIG. 8A; 803*b* overlapped with 801*b* of FIG. 8A; sub-interval 801*a* is greater than 805*b*; and sub-interval 803*b* is greater than 801*b*); and sub-intervals 801*c*, 801*d*, 803*c*, and 805*c* remain because, even though they overlap with other sub-intervals, they all are located later in the content item (e.g., after 5:00 of the content item) and, therefore, are not removed.

With the total interval being determined for each theme, data can be stored to identify the themes and the intervals of each theme with respect to the content item. In other words, data can be stored that identifies segments of the content item by theme. As discussed above with respect to step 307 of FIG. 3, storing data to identify the themes and the intervals of each theme may include creating and/or storing a data structure that has a record for each theme, and in each record there would be descriptive text for that theme (e.g., the words from the textual description corresponding to the theme), and data identifying the sentences/times in the content item that are in that theme (e.g., the start and end times of the sub-intervals from the total intervals corresponding to that theme). In one example, a data structure that identifies the themes and the intervals of each theme can include data representing the total intervals (and/or the sub-intervals) illustrated in FIG. 8B. With respect to a data structure based on the total intervals of FIG. 8B, the data structure could include the words of the first theme ("Character A changes her name") and data fields that include the start and/or end times (and/or start/end sentences) of each sub-interval in the corresponding total interval (e.g., total interval 811, which includes sub-intervals 801*a*, 801*c* and 801*d*). The data structure could also include similar data for the second theme and the third theme. The data structure may also include other data such as data identifying the content item. Another example would be a data structure including data representing the total intervals (and/or sub-intervals) illustrated in FIG. 8A.

The stored data may be part of a searchable index (e.g., segment database 103 of FIG. 1) that allows searching for segments of content items based on certain queries (e.g., a query for segments matching, or similar to, a particular theme; a query for segments matching, or similar to, a particular word; etc.). For example, the system may receive a query for segments similar to a particular theme (e.g., "Character A changes her name"). The index may be searched and segments of content items that match or are similar to the particular theme may be identified from the stored data structure. Continuing the above example, since the data structure includes records for a theme matching "Character A changes her name", such as a record including data based on the total interval graphically illustrated in FIG. 8A by total interval 801, these records would be found by the search. Additionally, if other records exist in the data structure that match, or are similar to the theme, they would also be found by the search (e.g., segments from a different content item having the same or a similar theme, etc.) The found data records can be used to supply a user with segments of the content item. In one instance, if the content item is a video, portions of video corresponding to the start and end times may be transmitted (e.g., the video corresponding to the start and end times of sub-intervals 801*a*, 801*b*, 801*c*, 801*d* of FIG. 8B) The segments may be transmitted as a continuous video stream to a requesting user (e.g., a video where all segments addressing a given topic, across multiple news television programs, are played consecutively in a single on-demand stream). In another instance, a list identifying the segments may be transmitted that allows a user to select particular portions to view and/or store (e.g., a user may view a program guide listing television programs, enter a search query for a particular topic/theme, view results responsive to the search that identify different segments of one or more television programs, and select at least one segment for viewing)

In some embodiments, the searchable index may be included as part of another service (e.g., a video-on-demand service, a web and/or Internet service, etc.) that utilizes a search function, allowing a user to conduct a search for requested themes (e.g., a user could indicate a desire to see the story arc involving Jin and Sun from all seasons of the television show "Lost", and be presented with a single stream containing snippets with those characters, such as segments indexed with a theme including an identification of "Jin" or "Sun"). In yet another instance, portions of content items corresponding to the theme of a content item that is currently being consumed by a user can be retrieved and supplied to the user device. In one such embodiment, the user may indicate their wish to view additional information about a portion of the current content item (e.g., a user may press an appropriate button on a remote control). The associated command may then be communicated to the content supplier which causes a theme for the current content item (e.g., current television program) to be determined (e.g., the theme of the current segment of the current television program). Upon determining the theme of the current content item, other portions of other content items may then be retrieved based on the determined theme and subsequently supplied to the user device for consumption by the user. For example, the user may be watching a television program and the current segment of the television program may be "The Building of the Eiffel Tower." One or more other segments from different programs may be retrieved and transmitted to the user having a label that is the same as, or similar to, the "The Building of the Eiffel Tower" (e.g., "Eiffel Tower," "Building of the Statue of Liberty," etc.) Additionally, the retrieved portions may be transmitted with additional information, such as text describing the theme, the time-code of the segment's position in the content item, etc. Such additional information may be displayed to a user upon consumption of the segment and/or transmitted information.

In a second example, the searchable index may be used by an advertising system. In one instance, the advertising system may insert advertisements into content items based on the themes of a content item and/or an advertisement. In one embodiment, the advertising system may insert an advertisement into the content item near a segment (e.g., before the segment, after the segment, in a transition between the segment and another segment, etc.). In some arrangements the advertisement may be thematically similar to the theme of that segment (e.g., a mystery plotline segment may be thematically similar to an advertisement parodying a mystery plotline, etc.). For example, the system may insert advertisements near segments based on whether the segment and an advertisement have the same or similar themes (e.g., a segment having a theme related to the "Eiffel Tower" may cause the system to insert advertisements for travel-related activities, such as hotels, airlines, travel booking services, etc.).

In another example, the themes of the content items that have been transmitted to a user device may be monitored to determine the consumption habits of the user (e.g., determine one or more themes that are often included in content items viewed by the user). In one instance, if the system determines that a user typically views certain themes (e.g., travel-related themes, such as by watching programs having themes related to the "Eiffel Tower" or "Japan" or "flight") thematically similar content items may be transmitted to a user device as a recommendation to that user (e.g., content items having themes similar to "Eiffel Tower" or "Japan" or "flight" may be transmitted to the user as a recommendation for viewing). In another instance, the monitored viewing habits may be used by an advertising system (e.g., targeting advertisements to the user based on viewing habits, etc.).

Although specific examples of carrying out the features above have been described, those skilled in the art will appreciate that there are numerous variations and permutations of the above-described systems and methods that are contained within the spirit and scope of the invention as set forth in the appended claims. For example, instead of calculating relevance intervals for an entire transcript (as seen above at step 302 of FIG. 3), alternative embodiments could calculate the relevance intervals on an as-needed basis. Some embodiments may process the textual description of a content item to identify the themes and calculate relevance intervals from the transcript as part of the process for determining the total interval for each theme. For each term in a theme, the transcript could be searched for occurrences of the term. When an occurrence is found in the transcript, the relevance interval for that occurrence could be calculated (e.g., using the method of FIG. 4). Similarly, the relevance interval for other occurrences in the transcript could be calculated. This could be repeated for each term in a theme (and then repeated again for all terms in the other themes).

Additionally, numerous other embodiments, modifications and variations within the scope and spirit of the appended claims will occur to persons of ordinary skill in the art from a review of this disclosure.

We claim:
1. A method comprising:
   determining, by a computing device and for each term in a first plurality of terms selected from a dialog of a content item, a relevance interval for the term by identifying one or more portions of the dialog that are relevant to the term based on a similarity measurement for a first term in the one or more portions, the first term being different from the term, wherein the determining results in relevance intervals for the first plurality of terms;
   determining, from a textual description of the content item, a second plurality of terms;

determining relevance intervals for the second plurality of terms by searching, based on the second plurality of terms, the relevance intervals for the first plurality of terms;
determining a first composite relevance interval by removing a first relevance interval from the relevance intervals for the second plurality of terms or by merging a second relevance interval from the relevance intervals for the second plurality of terms with a third relevance interval from the relevance intervals for the second plurality of terms;
receiving, after storing the first composite relevance interval as part of a searchable index, a query associated with content currently being viewed by a user;
determining, based on the query and the searchable index, the first composite relevance interval; and
causing, based on the query, display of a first portion of the content item that corresponds to the first composite relevance interval.

2. The method of claim 1, wherein the similarity measurement comprises a statistical measurement of term co-occurrence in corpus data, wherein a transcript of the content item comprises the dialog, and wherein the method further comprises:
receiving the transcript of the content item; and
storing the relevance intervals for the first plurality of terms in a database;
wherein the textual description comprises a user-provided description of the content item;
wherein the searching, based on the second plurality of terms, the relevance intervals for the first plurality of terms comprises determining that one of the first plurality of terms matches one of the second plurality of terms.

3. The method of claim 1, wherein the second plurality of terms indicates a first theme, wherein the first composite relevance interval indicates one or more first portions of the content item relevant to the first theme, and wherein the method further comprises:
preparing the searchable index to associate the first composite relevance interval with the first theme; and
wherein the query indicates a theme associated with the content currently being viewed by the user.

4. The method of claim 1, further comprising:
determining, from the textual description, a third plurality of terms;
determining relevance intervals for the third plurality of terms by searching, based on the third plurality of terms, the relevance intervals for the first plurality of terms;
determining a second composite relevance interval by removing a fourth relevance interval from the relevance intervals for the third plurality of terms or by merging a fifth relevance interval from the relevance intervals for the third plurality of terms with a sixth relevance interval from the relevance intervals for the third plurality of terms; and
after determining the first composite relevance interval, filtering the first composite relevance interval by determining that a first sub-interval of the first composite relevance interval overlaps with a second sub-interval of the second composite relevance interval and by removing the first sub-interval from the first composite relevance interval.

5. The method of claim 4, further comprising:
after determining the relevance intervals for the second plurality of terms, filtering the relevance intervals for the second plurality of terms;
after determining the relevance intervals for the third plurality of terms, filtering the relevance intervals for the third plurality of terms;
after determining the relevance intervals for the second plurality of terms, merging the relevance intervals for the second plurality of terms;
after determining the relevance intervals for the third plurality of terms, merging the relevance intervals for the third plurality of terms;
after determining the second composite relevance interval, filtering the second composite relevance interval;
after determining the first composite relevance interval, merging the first composite relevance interval; and
after determining the second composite relevance interval, merging the second composite relevance interval.

6. The method of claim 1, wherein determining the first composite relevance interval is performed by:
removing the first relevance interval from the relevance intervals for the second plurality of terms based on a size of the first relevance interval, an overlap of the first relevance interval with another relevance interval of the relevance intervals for the second plurality of terms, an adjacency of the first relevance interval with another relevance interval of the relevance intervals for the second plurality of terms, or a content item location of the first relevance interval.

7. The method of claim 1, wherein determining the first composite relevance interval is performed by:
merging the second relevance interval with the third relevance interval based on an overlap of the second relevance interval with the third relevance interval or an adjacency of the second relevance interval with the third relevance interval.

8. A method comprising:
determining, by a computing device and for each term in a first plurality of terms selected from a dialog of a content item, a relevance interval for the term by identifying one or more portions of the dialog that are relevant to the term based on a similarity measurement for a first term in the one or more portions, the first term being different from the term, wherein the determining results in relevance intervals for the first plurality of terms;
determining, from a textual description of the content item, a second plurality of terms;
determining relevance intervals for the second plurality of terms by searching, based on the second plurality of terms, the relevance intervals for the first plurality of terms;
determining a first composite relevance interval by removing a first relevance interval from the relevance intervals for the second plurality of terms or by merging a second relevance interval from the relevance intervals for the second plurality of terms with a third relevance interval from the relevance intervals for the second plurality of terms;
receiving, after storing the first composite relevance interval as part of a searchable index, a query associated with an advertisement;
determining, based on the query and the searchable index, the first composite relevance interval;

generating, based on the first composite relevance interval, a data stream that comprises the advertisement and a first portion of the content item; and causing, based on the data stream, display of the advertisement and the first portion of the content item.

9. The method of claim 8, wherein the similarity measurement comprises a statistical measurement of term co-occurrence in corpus data, wherein the textual description comprises two or more sentences that each indicates a respective theme, wherein the second plurality of terms is from a first sentence of the two or more sentences, wherein the first composite relevance interval represents one or more first portions of the content item relevant to a first theme, and wherein the first sentence indicates the first theme.

10. The method of claim 9, further comprising:
preparing the searchable index to associate the first composite relevance interval with the first theme;
wherein the query indicates the first theme.

11. The method of claim 8, further comprising:
determining, from the textual description, a third plurality of terms;
determining relevance intervals for the third plurality of terms by searching, based on the third plurality of terms, the relevance intervals for the first plurality of terms;
determining a second composite relevance interval by removing a fourth relevance interval from the relevance intervals for the third plurality of terms or by merging a fifth relevance interval from the relevance intervals for the third plurality of terms with a sixth relevance interval from the relevance intervals for the third plurality of terms; and
after determining the first composite relevance interval, filtering the first composite relevance interval by determining that a first sub-interval of the first composite relevance interval overlaps with a second sub-interval of the second composite relevance interval and by removing the first sub-interval from the first composite relevance interval.

12. The method of claim 8, wherein determining the first composite relevance interval is performed by:
removing the first relevance interval from the relevance intervals for the second plurality of terms based on a size of the first relevance interval, or an overlap of the first relevance interval with another relevance interval of the relevance intervals for the second plurality of terms.

13. The method of claim 8, wherein determining the first composite relevance interval is performed by:
merging the second relevance interval with the third relevance interval based on an overlap of the second relevance interval with the third relevance interval, or an adjacency of the second relevance interval with the third relevance interval.

14. A method comprising:
determining, by a computing device and for each term in a first plurality of terms selected from a dialog of a content item, a relevance interval for the term by identifying one or more portions of the dialog that are relevant to the term based on a similarity measurement for a first term in the one or more portions, the first term being different from the term, wherein the determining results in relevance intervals for the first plurality of terms;
determining, from a textual description of the content item, a second plurality of terms;

determining relevance intervals for the second plurality of terms by searching, based on the second plurality of terms, the relevance intervals for the first plurality of terms;
determining a first composite relevance interval by removing a first relevance interval from the relevance intervals for the second plurality of terms or by merging a second relevance interval from the relevance intervals for the second plurality of terms with a third relevance interval from the relevance intervals for the second plurality of terms;
receiving, after storing the first composite relevance interval as part of a searchable index, a query associated with a content consumption habit for a user;
determining, based on the query and the searchable index, the first composite relevance interval; and
causing, based on the query, display of a first portion of the content item that corresponds to the first composite relevance interval.

15. The method of claim 14, wherein the similarity measurement comprises a statistical measurement of term co-occurrence in corpus data, wherein a transcript of the content item comprises the dialog, and wherein the method further comprises:
receiving the transcript of the content item;
wherein the searching, based on the second plurality of terms, the relevance intervals for the first plurality of terms comprises determining that one of the first plurality of terms matches one of the second plurality of terms.

16. The method of claim 14, wherein the second plurality of terms indicates a first theme, wherein the first composite relevance interval indicates one or more first portions of the content item relevant to the first theme, and wherein the method further comprises:
preparing the searchable index to associate the first composite relevance interval with the first theme; and
wherein the query indicates the first theme.

17. The method of claim 14, further comprising:
determining, from the textual description, a third plurality of terms;
determining relevance intervals for the third plurality of terms by searching, based on the third plurality of terms, the relevance intervals for the first plurality of terms;
determining a second composite relevance interval by removing a fourth relevance interval from the relevance intervals for the third plurality of terms or by merging a fifth relevance interval from the relevance intervals for the third plurality of terms with a sixth relevance interval from the relevance intervals for the third plurality of terms; and
after determining the first composite relevance interval, filtering the first composite relevance interval by determining that a first sub-interval of the first composite relevance interval overlaps with a second sub-interval of the second composite relevance interval and by removing the first sub-interval from the first composite relevance interval.

18. The method of claim 17, further comprising:
after determining the relevance intervals for the second plurality of terms, filtering the relevance intervals for the second plurality of terms;
after determining the relevance intervals for the third plurality of terms, filtering the relevance intervals for the third plurality of terms;

after determining the relevance intervals for the second plurality of terms, merging the relevance intervals for the second plurality of terms;

after determining the relevance intervals for the third plurality of terms, merging the relevance intervals for the third plurality of terms;

after determining the second composite relevance interval, filtering the second composite relevance interval;

after determining the first composite relevance interval, merging the first composite relevance interval; and after determining the second composite relevance interval, merging the second composite relevance interval.

19. The method of claim 14, wherein determining the first composite relevance interval is performed by:

removing the first relevance interval from the relevance intervals for the second plurality of terms based on a size of the first relevance interval, an overlap of the first relevance interval with another relevance interval from the relevance intervals for the second plurality of terms, an adjacency of the first relevance interval with another relevance interval from the relevance intervals for the second plurality of terms, or a content item location of the first relevance interval.

20. The method of claim 14, wherein determining the first composite relevance interval is performed by:

merging the second relevance interval with the third relevance interval based on an overlap of the second relevance interval with the third relevance interval or an adjacency of the second relevance interval with the third relevance interval.

* * * * *

UNITED STATES PATENT AND TRADEMARK OFFICE
CERTIFICATE OF CORRECTION

PATENT NO. : 10,467,289 B2
APPLICATION NO. : 13/195944
DATED : November 5, 2019
INVENTOR(S) : Ambwani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this
Eleventh Day of August, 2020

Andrei Iancu
*Director of the United States Patent and Trademark Office*